US009989349B2

(12) United States Patent
Saxey et al.

(10) Patent No.: US 9,989,349 B2
(45) Date of Patent: Jun. 5, 2018

(54) DISPLACEMENT MEASUREMENT SYSTEMS AND METHODS

(71) Applicant: CoreBrace, LLC, West Jordan, UT (US)

(72) Inventors: Brandt Saxey, Alpine, UT (US); Aaron M. Best, Murray, UT (US)

(73) Assignee: CoreBrace, LLC, West Jordan, UT (US)

( * ) Notice: Subject to any disclaimer, the term of this patent is extended or adjusted under 35 U.S.C. 154(b) by 146 days.

(21) Appl. No.: 15/222,805

(22) Filed: Jul. 28, 2016

(65) Prior Publication Data

US 2017/0030701 A1 Feb. 2, 2017

Related U.S. Application Data

(60) Provisional application No. 62/198,370, filed on Jul. 29, 2015.

(51) Int. Cl.
  *E04H 9/02* (2006.01)
  *G01B 7/16* (2006.01)
  (Continued)

(52) U.S. Cl.
  CPC .................. *G01B 7/18* (2013.01); *E04B 1/98* (2013.01); *E04C 3/02* (2013.01); *E04C 3/293* (2013.01);
  (Continued)

(58) Field of Classification Search
  None
  See application file for complete search history.

(56) References Cited

U.S. PATENT DOCUMENTS

| 4,730,497 A * | 3/1988 | Rabensteiner | G01L 1/2218 73/768 |
| 6,619,136 B2 * | 9/2003 | Basile | G01L 5/0047 73/760 |

(Continued)

OTHER PUBLICATIONS

Nishizawa, et al., Development of the structural damage monitoring system using "Buckling-restrained brace with built-in displacement sensor", 16th World Conference on Earthquake, 16WCEE 2017, Jan. 9 to 13, 2017, Paper No. 1163, Santiago Chile.

*Primary Examiner* — Harshad R Patel
*Assistant Examiner* — Brandi Hopkins
(74) *Attorney, Agent, or Firm* — Craig Metcalf; Kirton McConkie

(57) ABSTRACT

A system may measure displacement in an architectural brace that absorbs deformation inducing energy. The architectural brace may have a core member with first and second ends attachable to architectural features, and an intermediate portion between the first and second ends. The architectural brace may also have a buckling restraining assembly that encases the intermediate portion to resist buckling of the intermediate portion. The system may have a first coupling with a first attachment feature securable to the first end of the core member, and a second coupling with a second attachment feature securable to the second end of the core member. The second coupling may be displaced from the first coupling by a displacement. Further, the system may have a sensor that measures a plurality of changes in the displacement occurring over a period of time. The sensor may provide measurement data indicative of the changes.

20 Claims, 17 Drawing Sheets

(51) Int. Cl.
*E04B 1/98* (2006.01)
*E04C 3/02* (2006.01)
*E04C 3/293* (2006.01)

(52) U.S. Cl.
CPC ............ *E04H 9/021* (2013.01); *E04H 9/024* (2013.01); *E04C 2003/026* (2013.01); *E04H 9/028* (2013.01)

(56) References Cited

U.S. PATENT DOCUMENTS

| | | |
|---|---|---|
| 8,763,320 B1 | 7/2014 | Chou et al. |
| 2005/0257490 A1 | 11/2005 | Pryor et al. |
| 2008/0083173 A1 | 4/2008 | Smelser |
| 2010/0005737 A1 | 1/2010 | Tsai et al. |
| 2014/0041320 A1 | 2/2014 | Li et al. |
| 2017/0081845 A1* | 3/2017 | Kinoshita ............... E04B 1/985 |

\* cited by examiner

DISPLACEMENT MEASUREMENT SYSTEMS AND METHODS

RELATED APPLICATION

This application claims priority to U.S. Provisional Patent Application Ser. No. 62/198,370, filed Jul. 29, 2015 and titled ARCHITECTURAL BRACE DISPLACEMENT MEASUREMENT SYSTEMS AND METHODS, which is incorporated herein by reference in its entirety.

BACKGROUND

Architectural braces are currently used to provide support between architectural features to prevent excessive motion of the architectural features relative to each other. One type of architectural brace that serves as a stabilizer to resist damage from deformation inducing events may have a core member and a buckling restraining assembly. The core member may be formed of a metal, and may have first and second ends attached to the architectural features, and an intermediate portion between the first and second ends. The buckling restraining assembly may have a cement layer that surrounds the intermediate portion of the core member to resist buckling of the intermediate portion, and a casing formed of metal that defines an interior cavity that contains the cement layer and keeps the cement layer in place. One exemplary architectural brace is disclosed in U.S. Pat. No. 7,174,680.

Such architectural braces can help a building retain structural integrity in the event of a deformation inducing event. However, the deformation undergone by the core member in a deformation inducing event may well exceed the elastic limits of its material. Further, deformation inducing events may cause the core member to undergo alternating tension and compression displacements. Such reversed loading may weaken the material of the architectural brace, reducing the likelihood that the architectural brace will withstand another deformation inducing event.

Accordingly, such architectural braces may need to be examined after the occurrence of a deformation inducing event in order to determine whether they need to be replaced with new architectural braces. Unfortunately, because the intermediate portion of the core member is encased in the cement layer, it is not possible to examine the intermediate portion of the core member directly, without destroying the architectural brace. The actual strain experienced by the architectural brace may be difficult to predict, even knowing the magnitude of the deformation inducing event, due to the complexity introduced by the building's architecture.

Even if the maximum strain experienced by the architectural brace is known, this may not be sufficient to assess the structural integrity of the core member, without more information regarding the number and/or amplitude of reversed loads experienced by the core member. Accordingly, there is a need in the art for systems and methods of determining whether architectural braces are in need of replacement after the occurrence of a deformation inducing event.

BRIEF SUMMARY OF THE INVENTION

Some embodiments described in the present disclosure relate to systems and methods for supporting buildings. More specifically, some embodiments described in the present disclosure relate to systems and methods for providing support to a building structure in the event of a deformation inducing event. A "deformation inducing event" is an event that causes deformation in a building structure. Such deformation inducing events may include seismic events such as earthquakes, tremors, and aftershocks. Further, such deformation inducing events may include wind storms, thermally-induced displacements, blast events, and the like.

Some embodiments described in the present disclosure are generally directed to systems and methods for measuring the displacement caused by strain in architectural braces. However, it is understood that systems and methods to measure displacement and/or determine strain described in the present disclosure may have use in any number of applications, according to some embodiments. For example, the systems and methods described in the present disclosure may have use in measuring displacement in machinery or equipment that is subject to shock and vibration and/or where control and positioning are important, such as concrete and asphalt grinders, graders, blades, bulldozers, loaders, trucks with dump beds, tractors, self-propelled swathers and combines, machines with cutter head position control, etc. As another example, the systems and methods described in the present disclosure may have use in measuring displacement in machinery or equipment used in various types of building monitoring, such as door position monitoring, long-term wall sensing, long-term roof sensing, etc. As a further example, the systems and methods described in the present disclosure may have use in measuring displacement in industrial machinery or equipment where low-cost resolution position feedback is useful, such as assembly line systems, conveyor systems, etc.

As used herein, the term "displacement" refers to relative motion between parts of one or more members, such as relative motion between two ends of a beam that may be caused by deformation of the beam. This may include linear, rotational, and/or mixed displacements. As used herein, the term "architectural" refers to any structural element, component, or member incorporated into a building, bridge, oil rig, or other ground-attached structure. However, it is understood that the systems and methods described in the present disclosure may have various other applications, as previously discussed.

As used herein, the term "architectural brace" refers to and includes any member that provides mechanical support to a structure. Such members may include any stabilizer, thermal link, damper, or other structural member known in the art.

In some embodiments, an architectural brace may have a core member with first and second ends attachable to architectural features, and an intermediate portion between the first and second ends. The architectural brace may also have a buckling restraining assembly that encases the intermediate portion to resist buckling of the intermediate portion. The buckling restraining assembly may have a cement layer that surrounds the intermediate portion of the core member to resist buckling of the intermediate portion, and a casing formed of metal that defines an interior cavity that contains the cement layer and keeps the cement layer in place.

A displacement measurement device may be used to measure the displacement in the core member caused by strain in the core member. The displacement measurement device may have a first coupling with a first attachment feature secured to the first end of the core member, and a second coupling with a second attachment feature secured to the second end of the core member. The second coupling may be displaced from the first coupling by a displacement. Further, the system may have a sensor that measures a plurality of changes in the displacement occurring over a period of time. The sensor may provide measurement data indicative of the changes.

In some embodiments, the displacement measurement device may pass through the interior of the casing, through the cement. In alternative embodiments, the displacement measurement device may be extend exterior to the cement, but may still be retained by the casing. In yet other embodiments, the displacement measurement device may be freestanding relative to the casing (i.e., connected only to the first and second ends of the core member, and not encircled by any portion of the casing).

The measurement data may be received by a computing device, which may be used to view and/or manipulate the measurement data. Additionally or alternatively, the displacement measurement device may have integrated componentry that can be used to view and/or manipulate the data without requiring a separate computing device. Additionally or alternatively, multiple displacement measurement devices (for example, connected to various architectural braces in a building) may be connected to a single computing device, via wired and/or wireless connections, to deliver the measurement data.

The displacement measurement device may have a power source such as a battery that provides electrical power to the sensor. If desired, the sensor may operate in a dormant mode, in which measurement data is not generated. When a deformation inducing event occurs, the sensor (or a different sensor of the displacement measurement device) may detect the onset of the deformation inducing event, and switch the sensor to an active mode in which the measurement data is generated. In this manner, the life of the power source may be extended. In some embodiments, the power source may be designed to remain charged for several years without requiring replacement or recharging.

In embodiments where the displacement measurement device stores the measurement data, the displacement measurement device may also have memory that records the measurement data. The measurement data may then be sent to a computing device through the use of an input/output module of the displacement measurement device. The displacement measurement device may have a housing that contains and protects the components described above from intrusion of particulate matter. The housing may advantageously be sealed to substantially prevent entry of solid material into its interior. Thus, if the displacement measurement device is embedded in the cement, it may resist intrusion of cement dust and particulates that may be generated in the cement during a deformation inducing event.

Advantageously, the sensor may measure the change in displacement between the first and second couplings at multiple points in time during the deformation inducing event. Thus, the measurement data may indicate not just the maximum displacement change, but rather, the manner in which the displacement between the first and second couplings varies over time during the deformation inducing event. This information may be used to calculate strain. In some embodiments, the pertinent characteristics of the core member may be programmed into the sensor so that the measurement data provides the strain of the core member, without requiring further calculations.

The deformation undergone by the core member may be very large, and may be on the order of several inches. Many known displacement sensors may not be suitable for measuring displacements in this range. Accordingly, the sensor of the displacement measurement device may have a configuration designed to facilitate measurement of relatively large displacement changes.

In some embodiments, the sensor may have a first conductive contact secured in a fixed position relative to the first coupling, and a plurality of additional conductive contacts secured in a plurality of fixed positions relative to the second coupling. In response to changes in the displacement between the first and second couplings, the first conductive contact may move along an axis relative to the plurality of additional conductive contacts. The additional conductive contacts may be distributed along the axis such that contact of the first conductive contact with any one of the plurality of additional conductive contacts is indicative of a specific magnitude of the displacement, and closes a circuit specific to that one of the additional conductive contacts to generate a subset of the measurement data that indicates the associated magnitude of the displacement.

These and other features and advantages of the present invention may be incorporated into certain embodiments of the invention and will become more fully apparent from the following description and appended claims, or may be learned by the practice of the invention as set forth hereinafter. The present invention does not require that all the advantageous features and all the advantages described herein be incorporated into every embodiment of the invention.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. These drawings depict only typical embodiments of the invention and are not therefore to be considered to limit the scope of the invention.

DETAILED DESCRIPTION OF THE INVENTION

The presently preferred embodiments of the present invention can be understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

Moreover, the Figures may show simplified or partial views, and the dimensions of elements in the Figures may be exaggerated or otherwise not in proportion for clarity. In addition, the singular forms "a," "an," and "the" include plural referents unless the context clearly dictates otherwise. Thus, for example, reference to a terminal includes reference to one or more terminals. In addition, where reference is made to a list of elements (e.g., elements a, b, c), such reference is intended to include any one of the listed elements by itself, any combination of less than all of the listed elements, and/or a combination of all of the listed elements.

The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the term "in" or "inwardly" refers to a location with respect to the device that, during normal use, is toward the inside of the device. Conversely, as used herein, the term "out" or "outwardly" refers to a location with respect to the device that, during normal use, is toward the outside of the device.

Figure 1:
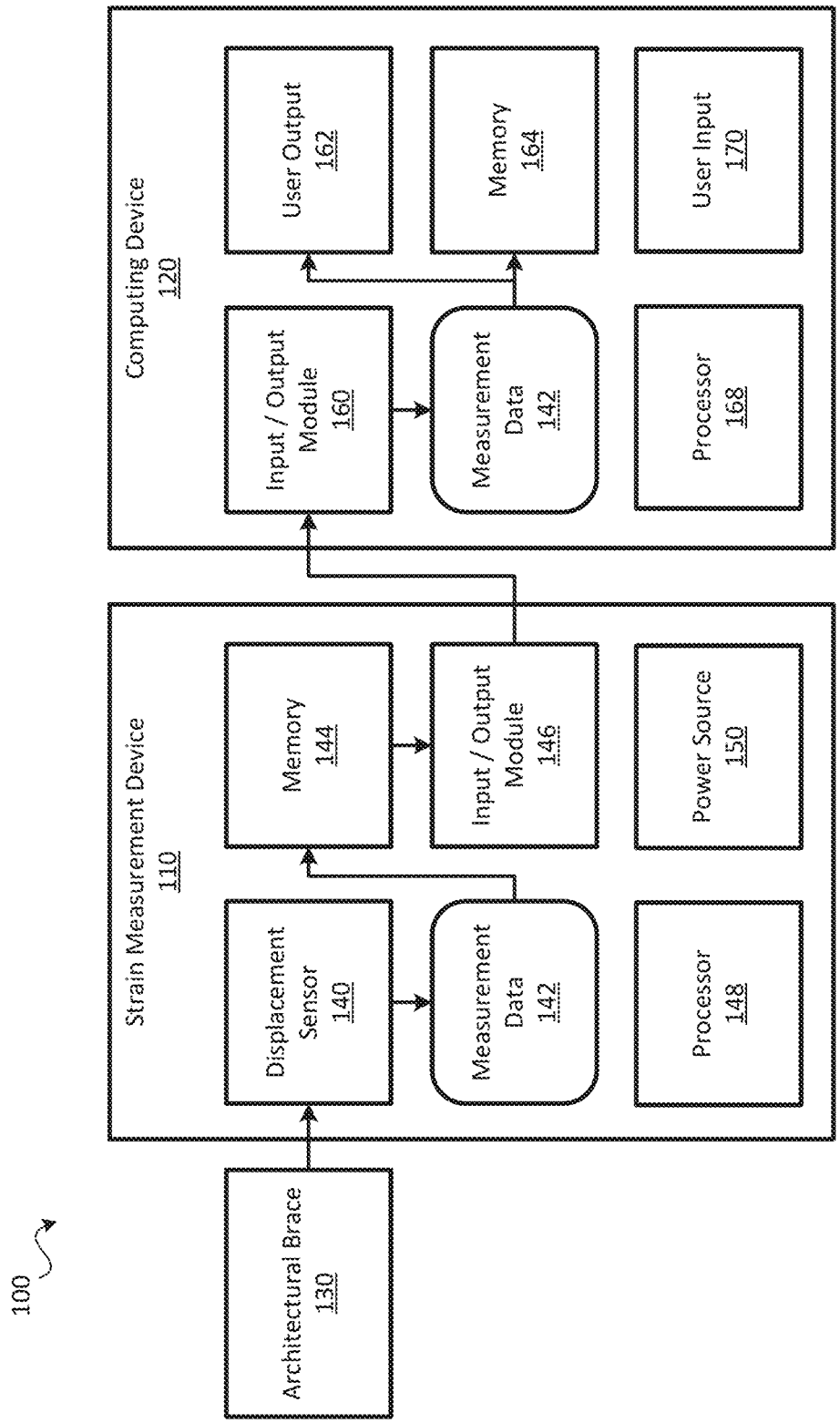
FIG. 1 is a schematic view of system for measuring displacement of an architectural brace, according to some embodiments.

Referring to FIG. 1, a schematic view illustrates a system 100 for measuring displacement of an architectural brace 130, according to one embodiment. As shown, the system 100 may include a displacement measurement device 110 and a computing device 120. The displacement measurement device 110 may be connected to the architectural brace 130 in such a manner that the displacement measurement device 110 is able to detect changes in displacement between the ends of the architectural brace 130, in a manner that will be shown and described subsequently. This displacement, in combination with the geometry of the architectural brace 130, may yield the strain present in the architectural brace 130. The pattern of strain experienced by the architectural brace 130 during a deformation inducing event may include the magnitude, frequency, and/or loading pattern of strain applied to the architectural brace 130. These items may help a user determine whether the architectural brace 130 requires repair or replacement after the occurrence of such a deformation inducing event.

The displacement measurement device 110 may have a displacement sensor 140, memory 144, an input/output module 146, a processor 148, and a power source 150. The displacement sensor 140 may detect the changes in displacement, as described above, and may provide measurement data 142 indicative of the changes. Further, the memory 144 may store the measurement data 142 and/or other data. In some embodiments, the memory 144 may store one or more attributes of the architectural brace 130 that can be combined via the processor 148 with the measurement data 142 to yield strain. Thus, the memory 144 may store the measurement data 142, and/or strain data derived from the measurement data 142. The measurement data 142 may be modified, compressed, organized, and/or otherwise manipulated by the processor 148.

The input/output module 146 may receive data, such as the measurement data 142, from the memory 144, and may transmit the data to an external device such as the computing device 120. The power source 150 may provide electrical power that powers the operation of the other components of the displacement measurement device 110. The power source 150 may be self-contained so that the displacement measurement device 110 is capable of operating for an extended period of time without connecting the displacement measurement device 110 to an external power source.

The displacement sensor 140 may include any known type of displacement measurement device. Such displacement measurement devices include, but are not limited to, linear variable displacement transducers (LVDT's), potentiometers, capacitive transducers, capacitive displacement sensors, eddy-current sensors, ultrasonic sensors, grating sensors, hall effect sensors, inductive non-contact position sensors, laser Doppler vibrometers, multi-axis displacement transducers, photodiode arrays, piezo-electric transducers, proximity sensors, and string potentiometers. Additionally or alternatively, the displacement sensor 140 may be of a new type made specifically for measurement of displacement in architectural braces. The displacement measurement device 110 may need to measure relatively large displacements (potentially on the order of several inches of elongation and/or several inches of shortening), and may need to have relatively low power consumption. A new displacement sensor type may advantageously be used to satisfy these criteria.

In some embodiments, the displacement sensor 140 may provide the measurement data 142 directly. Alternatively, the displacement sensor 140 may provide output in raw form, which may be modified to provide the measurement data 142. For example, in some embodiments, the output of the displacement sensor 140 may be analog, and may be processed via an analog-to-digital converter (ADC) or other component in order to provide the measurement data 142 in digital form.

The memory 144 may be of any known type, including but not limited to one or more hard drives, solid state drives, flash memory modules, DRAM chips, SDRAM chips, and/or the like. The memory 144 may include volatile memory, nonvolatile memory, or any combination thereof.

The input/output module 146 may be any device capable of sending or receiving data. In this application, the phrase "input/output" does not require that a module be capable of transmitting and receiving data; rather, an input/output module may be a device that only transmits data or only receives data. The input/output module 146 may, in some embodiments, be designed only to transmit data, and not to receive data. Further, the input/output module 146 may communicate wirelessly and/or through the use of one or more wired connections, and may use any known wired or wireless protocol, including but not limited to Ethernet, universal serial bus (USB), Wi-Fi, Bluetooth, near field communications (NFC), cellular, and/or the like.

The processor 148 may have any of a wide variety of types, including but not limited to microprocessors with x86-based architecture or other architecture known in the art, application-specific integrated circuits (ASICs), field-programmable gate arrays (FPGA's), and the like. The processor 148 may optionally include multiple processing elements, or "cores." The processor 148 may include a cache that provides temporary storage of data incident to the operation of the processor 148.

The power source 150 may be any device that supplies electrical power to the other components of the displacement measurement device 110. In some embodiments, the power source 150 may be made to last for many years, such as five years, ten years, fifteen years, twenty years, thirty years, forty years, fifty years, or even a hundred years, without requiring replacement or recharging. Alternatively, the power source 150 may be designed to be periodically recharged. In some embodiments, the power source 150 may be a battery of any type known in the art, including but not limited to alkaline batteries, Nickle Metal Hydride (NiMH) batteries, Lithium Ion (Li-ion) batteries, and/or the like. In some embodiments, the power source 150 may include a rechargeable battery that can be charged through the use of wired and/or wireless charging, such as inductive charging.

The computing device 120 may be any type of device capable of manipulating and/or displaying data, including but not limited to laptop computers, desktop computers, tablets, smartphones, phablets, and/or the like. The computing device 120 may have various components, such as an input/output module 160, a user output 162, memory 164, a processor 168, and a user input 170.

The input/output module 160 may receive the measurement data 142 and/or other data from the displacement measurement device 110, for example, via the input/output module 146 of the displacement measurement device 110. The measurement data 142 and/or other data received from the displacement measurement device 110 may be stored in the memory 164 of the computing device 120 and/or provided to the user via the user output 162. If desired, the measurement data 142 and/or other data received from the displacement measurement device 110 may be modified, compressed, organized, and/or otherwise manipulated by the processor 168 of the computing device 120. The user input 170 may be used by the user to control how the measurement data 142 and/or other data received from the displacement measurement device 110 is received, manipulated, and/or provided to the user.

The input/output module 160, the memory 164, and the processor 168 may each be of various types. More specifically, the input/output module 160 may be of any type indicated previously, in connection with the input/output module 146 of the displacement measurement device 110, and may advantageously communicate via the same wired and/or wireless protocol(s) used by the input/output module 146. The memory 164 may be of any of the types indicated previously in connection with the input/output module 146 of the displacement measurement device 110. Further, the processor 168 may be of any of the types indicated previously in connection with the processor 148 of the displacement measurement device 110.

The user output 162 may be any device that outputs data for a user. The user output 162 may provide the data (such as the measurement data 142 and/or other data received from the displacement measurement device 110) in raw form, in a table or chart, and/or in the form of a data visualization such as a chart or graph. The user output 162 may include any of various elements including but not limited to a display screen, speaker, a vibration device, LED or other lights, and/or other output devices known in the art.

The user input 170 may be any device that receives input, such as data, menu selections, and the like, from the user. The user input 170 may include one or more elements such as a touch screen, buttons, keyboard, mouse, trackball, track pad, stylus, digitizer, digital camera, microphone, and/or other user input devices known in the art. In some embodiments, the user input 170 may be combined with the user output 162, as may be the case with a touch screen.

In operation, a user may periodically and/or after the occurrence of a deformation inducing event, check the status of the architectural braces 130 of a building by connecting the computing device 120 to each of the displacement measurement devices 110 to receive the measurement data 142 and/or other data from each displacement measurement device 110. The user may view the measurement data 142 and/or other data, for example, on a display screen of the user output 162 of the computing device 120, and may use the measurement data 142 and/or other data to assess the integrity of each of the architectural braces 130. This may enable the user to determine whether each of the architectural braces 130 requires repair or replacement.

The system 100 of FIG. 1 represents only one of many possible configurations within the scope of the invention. Many possible modifications would be recognized by a person of skill in the art with the aid of the present disclosure. For example, the computing device 120 may be designed to remain in constant communication with the displacement measurement device 110. Hence, if desired, the memory 144 and/or the processor 148 maybe omitted from the displacement measurement device 110, and the measurement data 142 may be conveyed directly to the computing device 120. External power may be connected, wired and/or wirelessly, to the displacement measurement device 110, via the computing device 120 and/or independently of the computing device 120, in place of the power source 150.

In some embodiments, one computing device 120 may be connected to multiple displacement measurement devices 110. For example, a building may have multiple architectural braces 130, each of which has a displacement measurement device 110. The displacement measurement devices 110 may be connected to a computing device 120 that receives the measurement data 142 from all of the displacement measurement devices 110. This data may be displayed for a user, for example, on a user output 162 such as a display screen. Such a display screen may display measurement data 142 and/or other data received from all of the displacement measurement devices 110 in a single list, chart, data visualization, or other view. The wired or wireless connection of the displacement measurement devices 110 to the computing device 120 may convey the measurement data 142 and/or other data to the computing device 120 and/or supply electrical power to the displacement measurement devices 110.

In alternative embodiments, a displacement measurement device (not shown) may have functionality for receiving user input and/or providing user output. For example, such a displacement measurement device may have a user output, such as any of those listed in the description of the user output 162 of the computing device 120. Additionally or alternatively, such a displacement measurement device may have a user input, such as any of those listed in the description of the user input 170 of the computing device 120. In such an event, the displacement measurement device may perform the functions of a computing device. Thus, no computing device, independent of the displacement measurement device, may be needed.

Figure 2:
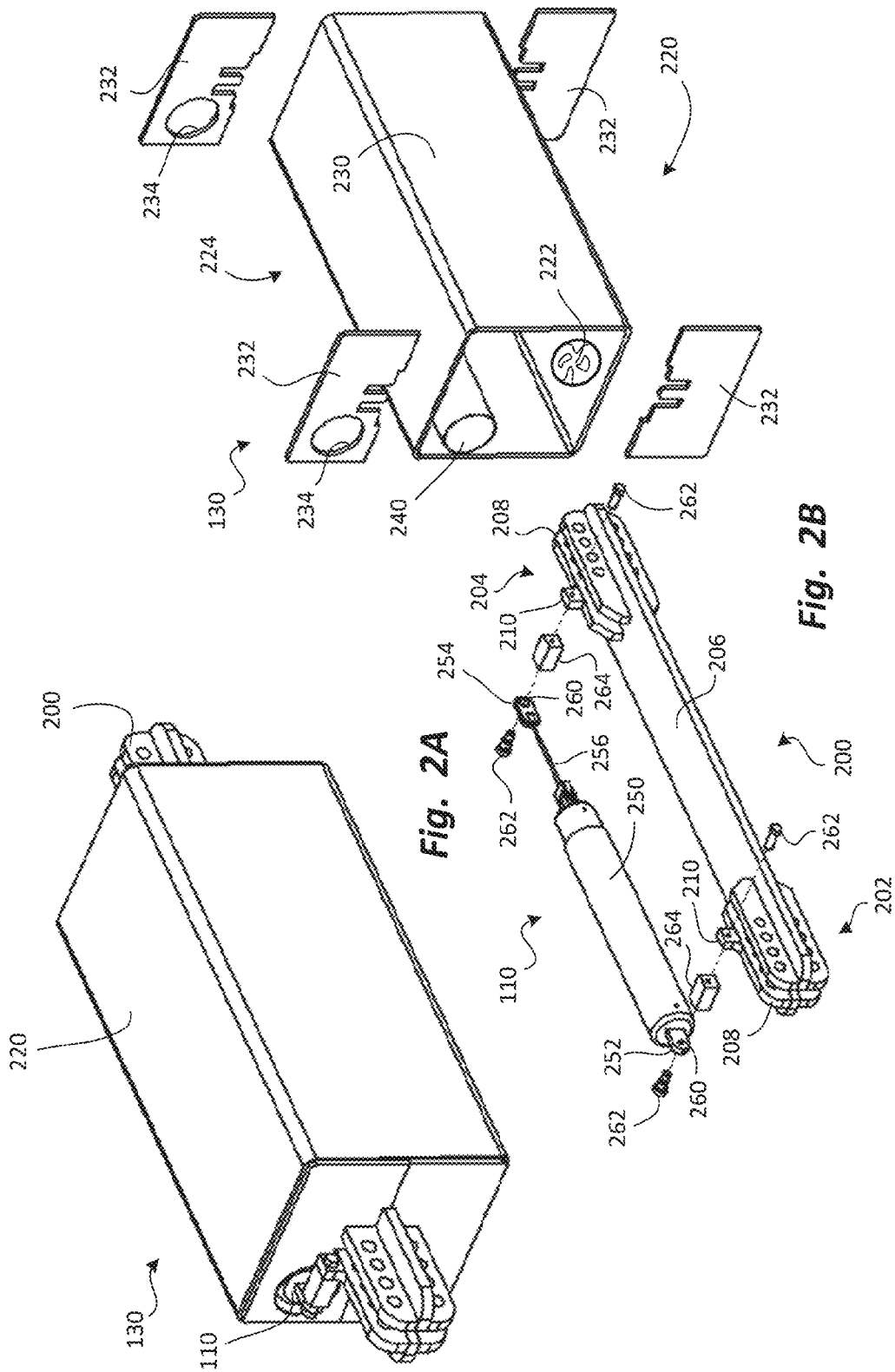
FIGS. 2A and 2B are perspective and exploded perspective views, respectively, of a displacement measurement device used to measure displacement in an architectural brace, with the displacement measurement device passing through the interior of the architectural brace, according to some embodiments.

Referring to FIGS. 2A and 2B, perspective and exploded perspective views, respectively, illustrate a displacement measurement device 110 used to measure displacement in an architectural brace 130, with the displacement measurement device 110 passing through the interior of the architectural brace 130, according to one embodiment. The computing device 120 is not shown in FIGS. 2A and 2B, but may be used in conjunction with the displacement measurement device 110 as set forth in the description of FIG. 1.

The architectural brace 130 may have a configuration like that set forth in U.S. Pat. No. 7,174,680, which is incorporated herein by reference. Specifically, the architectural brace 130 may have a core member 200 and a buckling restraining assembly 220. The core member 200 may be secured to architectural features (not shown) of a building to restrain relative motion between the architectural features, particularly in the event of a deformation inducing event. The core member 200 may thus be designed to receive a wide variety of loading patterns, including tension, compression, bending, torsion, and/or combinations thereof. The core member 200 may be made more resistant to buckling under compression by encasing the core member 200 in the buckling restraining assembly 220 in a manner that resists bending of the core member 200 within the buckling restraining assembly 220. The architectural brace 130 illustrated in FIGS. 2A and 2B is merely exemplary; architectural braces in a wide variety of shapes and sizes may be used in conjunction with the systems and methods of the present disclosure.

The core member 200 may have a first end 202, a second end 204, and an intermediate portion 206 between the first end 202 and the second end 204. The first end 202 and the second end 204 may each have anchoring flanges 208 that facilitate attachment of the first end 202 and the second end 204 to the architectural features to be retained. The anchoring flanges 208 may have holes or other mounting features that facilitate attachment of the first end 202 and the second end 204 to the architectural features. Further, the first end 202 and the second end 204 may each have a device anchoring projection 210, which may optionally extend from the anchoring flanges 208 as shown.

The restraining assembly 220 may have a cement layer 222 that surrounds the intermediate portion 206 of the core member 200, and a casing 224 that surrounds the cement layer 222 to keep the cement layer 222 in place. The cement layer 222 may be formed around the intermediate portion 206 so that the cement layer 222 surrounds and is in contact with the intermediate portion 206, to resist bending of the intermediate portion 206. In FIG. 2B, the cement layer 222 is illustrated in an inset, which represents the presence of the cement layer 222 throughout the interior of the casing 224. The casing 224 may substantially surround the cement layer 222.

The casing 224 may have a peripheral portion 230 that extends generally parallel to the length of the intermediate portion 206, and end plates 232 that cover the open ends of the peripheral portion 230. The peripheral portion 230 may have a square cross sectional shape as shown in FIG. 2B, or in the alternative, may have a rectangular, circular, ovoid, or other cross sectional shape. The end plates 232 may be divided into two plates for each end of the peripheral portion 230, so that the end plates 232 can be secured together and secured to the peripheral portion 230 around the protruding portion of the corresponding one of the first end 202 and the second end 204 of the core member 200, as illustrated in FIG. 2A. The end plates 232 need not cooperate with the peripheral portion 230 to form a hermetic seal around the cement layer 222, but may advantageously encase the cement layer 222 to a degree sufficient to keep the cement layer 222 within the casing 224.

If desired, the end plates 232 may have apertures 234 that allow the displacement measurement device 110 to be secured to the first end 202 and the second end 204 through the end plates 232 of the casing 224. A cylindrical cavity 240 may exist within the cement layer 222; the displacement measurement device 110 may pass through the cylindrical cavity 240. The cylindrical cavity 240 may be defined by a tubular wall, if desired, to isolate the displacement measurement device 110 from the cement layer 222. Alternatively, the displacement measurement device 110 may rely on its own housing to do this, as will be described subsequently. If desired, the cylindrical cavity 240 may be defined by pouring the cement layer 222 with the displacement measurement device 110 in place in the interior of the casing 224, so that the cement layer 222 is formed around the displacement measurement device 110.

The displacement measurement device 110 may have a housing 250, a first coupling 252, and a second coupling 254. The housing 250 may protect the internal components of the displacement measurement device 110 from intrusion of matter such as particulates that may be released from the cement layer 222, particularly in the course of a deformation inducing event. The first coupling 252 may be secured to the first end 202 of the core member 200, and the second coupling 254 may be secured to the second end 204 of the core member 200.

The displacement measurement device 110 may detect motion of the first end 202 relative to the second end 204 (i.e., a change in displacement between the first end 202 and the second end 204) by detecting a change in relative position between the first coupling 252 and the second coupling 254. The second coupling 254 may be coupled to the housing 250 via a rod 256 that can slide into and out of the housing 250, or is secured to a part of the housing that can slide (for example, telescopically) relative to the remainder of the housing to permit relative motion between the first coupling 252 and the second coupling 254. The displacement measurement device 110 may easily be adapted for use in architectural braces of various lengths by altering the length of the rod 256.

Each of the first coupling 252 and the second coupling 254 may have an attachment feature that facilitates attachment to the associated one of the first end 202 and the second end 204. In the exemplary embodiment of FIG. 2B, the first coupling 252 and the second coupling 254 may each have an attachment feature in the form of a fastening hole 260. The fastening hole 260 of the first coupling 252 may facilitate attachment of the first coupling 252 to the first end 202, or more specifically, to the device anchoring projection 210 of the first end 202, through the use of a fastener 262 such as a screw, bolt, or rivet that passes through the fastening hole 260 and through a corresponding hole in the device anchoring projection 210 of the first end 202. Similarly, the fastening hole 260 of the second coupling 254 may facilitate attachment of the second coupling 254 to the second end 204, or more specifically, to the device anchoring projection 210 of the second end 204, through the use of a fastener 262 such as a screw, bolt, or rivet that passes through the fastening hole 260 and through a corresponding hole in the device anchoring projection 210 of the second end 204.

The displacement measurement device 110 may be positioned at a desired offset from the system 100 by a pair of spacing blocks 264 positioned between the first coupling 252 and the device anchoring projection 210 of the first end 202 of the core member 200, and between the second coupling 254 and the device anchoring projection 210 of the second end 204 of the core member 200. Thus, the displacement measurement device 110 may be sufficiently displaced from the core member 200 to enable the core member 200 to avoid interference with the operation of the displacement measurement device 110, even as the core member 200 undergoes significant deflection.

The displacement measurement device 110 of FIGS. 2A and 2B represents only one of many possible displacement measurement devices within the scope of the present disclosure. One alternative displacement measurement device will be shown and described in connection with FIGS. 3A through 5C, as follows.

Referring to FIGS. 3A and 3B, perspective and exploded perspective views, respectively, illustrate a displacement measurement device 310 according to one alternative embodiment. The displacement measurement device 310 may be installed and used to measure displacement caused by strain in an architectural brace such as the architectural brace 130 of FIGS. 2A and 2B, in a manner similar to that of the displacement measurement device 110.

As shown, the displacement measurement device 310 may have a housing 320, a first coupling 322, a second coupling 324, and a sensor 326. The housing 320 may be designed to contain and protect the sensor 326 from intrusion of foreign matter, such as particulates from the cement layer 222. The first coupling 322 may be secured to the first end of an architectural brace such as the architectural brace 130 of FIGS. 2A and 2B, and the second coupling may be secured to the second end of an architectural brace, such as the architectural brace 130 of FIGS. 2A and 2B. The sensor 326 may detect changes in the displacement between the first coupling 322 and the second coupling 324 in order to assess displacement in the architectural brace 130.

The housing 320 may have a first portion 332 and a second portion 334. The first portion 332 may telescopically receive the second portion 334 in such a manner that a cavity 336 is defined in the interior of the first portion 332 and the second portion 334 of the housing 320. The first portion 332 and the second portion 334 may fit together in such a manner that the cavity 336 is protected from intrusion of foreign matter, such as particulate matter from the cement layer 222. Thus, the second portion 334 may have grooves 338, which may be sized to receive O-rings 340. When in place in the grooves 338, the O-rings 340 may contact the interior surface of the first portion 332 in such a manner that seal is provided between the first portion 332 and the second portion 334. However, this seal need not be hermetic, but may rather only be sufficient to substantially prevent entry of solid matter into the cavity 336 in order to prevent such solid matter from interfering with the operation of the sensor 326.

Further, the first portion 332 and the second portion 334 of the housing 320 may each have a hole 342 sized to receive a pin 344. Each of the pins 344 may extend across the cavity 336 in such a manner that the pins 344 retain the sensor 326, as will be explained subsequently. The pins 344 may be press fit, fastened, welded, and/or otherwise secured to the holes 342.

The first coupling 322 and the second coupling 324 may be designed to be secured to the ends of a core member of an architectural brace, such as the first end 202 and the second end 204 of the core member 200 of the architectural brace 130. The first coupling 322 and the second coupling 324 may thus each have an attachment feature that facilitates such securement. For example, the first coupling 322 and the second coupling 324 may each have an aperture 350 through which a fastener, such as a screw, bolt, or rivet can pass to secure the first coupling 322 and the second coupling 324 to the first end 202 and the second end 204, respectively.

The sensor 326 may be of a type specifically designed for measurement of the deflections that occur in architectural braces. The sensor 326 may have a bracket 358 and a slider 360 that rides on and slides relative to the bracket 358. The bracket 358 may be secured to the first portion 332 of the housing 320, and thence to the first coupling 322, via a first connector 362. Similarly, the slider 360 may be secured to the second portion 334 of the housing 320, and thence to the second coupling 324, via a second connector 364. Specifically, the slider 360 may be secured to the second connector 364 by a rod 366 that extends parallel to the length of the bracket 358. A spring 368 may be positioned to encircle the rod 366, and may be secured at its ends to the bracket 358 and to the slider 360. The sensor 326 may function by detecting the position of the slider 360 on the bracket 358. The spring 368 may help the slider 360 to move to a neutral position on the bracket 358 in the absence of force moving the slider 360 to a different position. The configuration and operation of the sensor 326 will be shown and described in greater detail subsequently.

Figure 3:
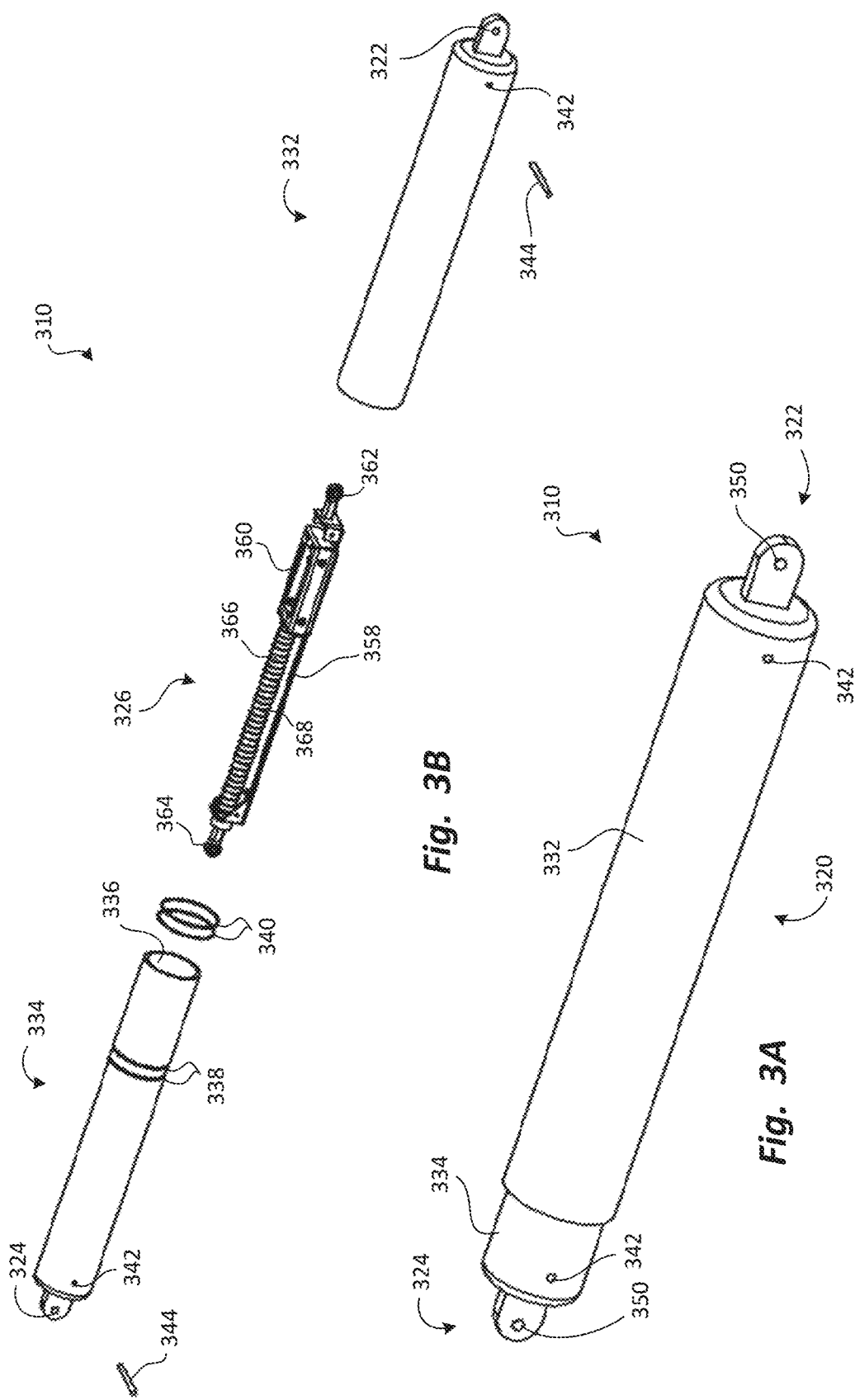
FIGS. 3A and 3B are perspective and exploded perspective views, respectively, of the displacement measurement device of FIGS. 2A and 2B, according to some embodiments.
Figure 4:
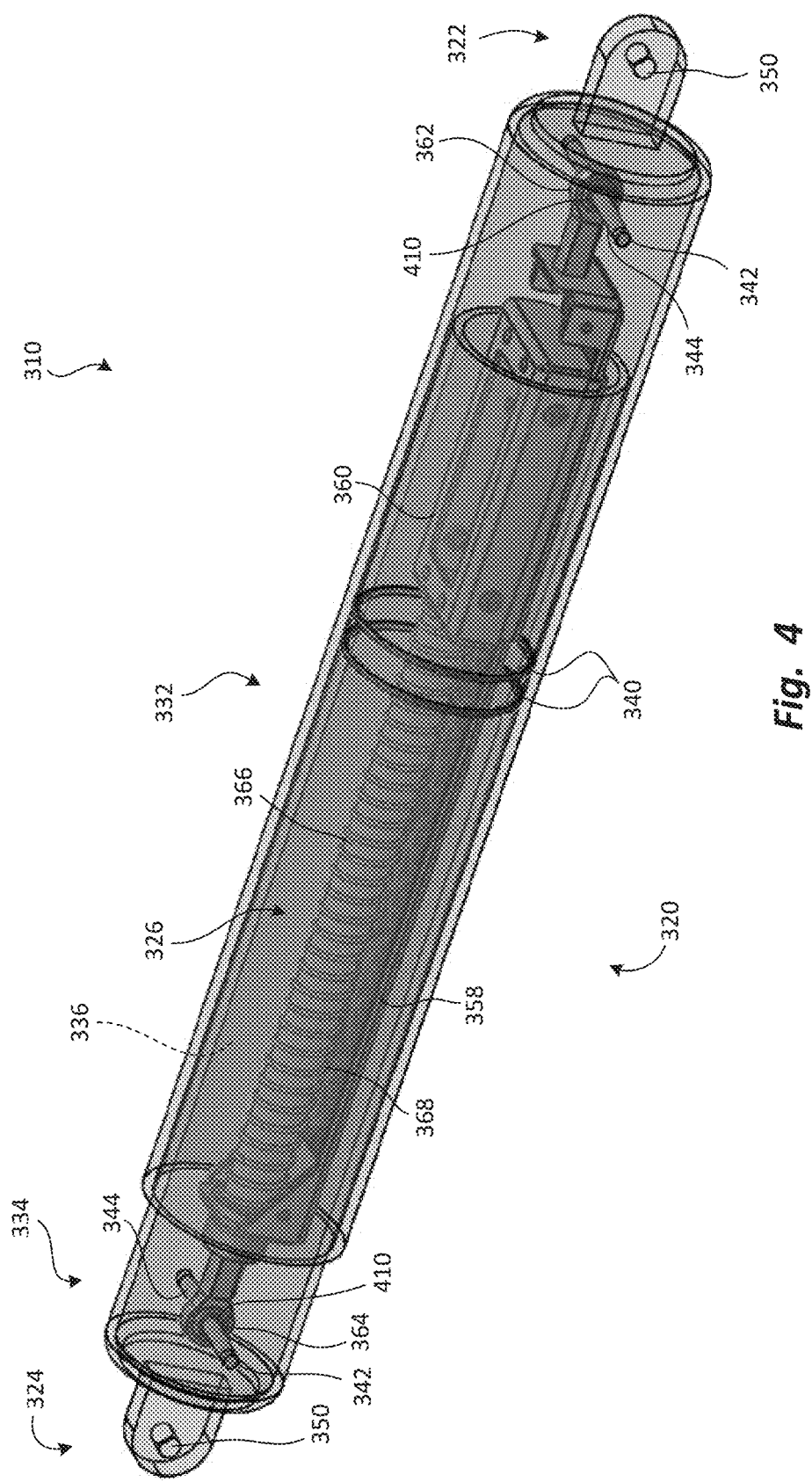
FIG. 4 is a perspective view of the displacement measurement device of FIGS. 3A and 3B, with the housing illustrated in transparent form to reveal the interior of the displacement measurement device, according to some embodiments.

Referring to FIG. 4, a perspective view illustrates the displacement measurement device 310 of FIGS. 3A and 3B, with the housing 320 illustrated in transparent form to reveal the interior of the displacement measurement device 310. As shown, the open end of the second portion 334 of the housing 320 may be received within the open end of the first portion 332 of the housing 320, so that the cavity 336 is enclosed by the first portion 332 and the second portion 334.

Further, the pin 344 passing through the hole 342 of the first portion 332 of the housing 320 may also pass through an eyelet 410 formed in the first connector 362 of the sensor 326. Similarly, the pin 344 passing through the hole 342 of the second portion 334 of the housing 320 may also pass through an eyelet 410 formed in the second connector 364 of the sensor 326. Thus, relative motion between the architectural elements may cause the first end 202 and the second end 204 of the core member 200 to move relative to each other. This motion may be replicated in the first coupling 322 and the second coupling 324 of the displacement measurement device 310. Relative motion between the first coupling 322 and the second coupling 324 may cause the first portion 332 and the second portion 334 of the housing 320 to move relative to each other. Thus, the second portion 334 may slide further into and/or outward from the first portion 332 so that the housing 320 elongates and/or shortens in response to relative motion between the architectural elements.

This relative motion between the first portion 332 and the second portion 334 may be conveyed to the first connector 362 and the second connector 364 of the sensor 326 by virtue of the pins 344. Thus, as the architectural features move relative to each other, the first connector 362 may move relative to the second connector 364. This motion may cause the slider 360 to move along the bracket 358. The position of the slider 360 on the bracket 358 may be detected by the sensor 326, as will be set forth in detail in connection with FIGS. 5A, 5B, and 5C.

Referring to FIGS. 5A and 5B, perspective and exploded perspective views, respectively, illustrate the sensor 326 of the displacement measurement device 310 of FIGS. 3A and 3B in greater detail. The sensor 326 may have the bracket 358, the slider 360, the first connector 362, the second connector 364, the rod 366, and the spring 368, as indicated previously. These components are shown fully assembled in FIG. 5A, and individually in FIG. 5B. When assembled, the slider 360 may slide on the bracket 358 along an axis 500, which may be oriented parallel to the architectural brace 130.

The bracket 358 may have a tray 510, a first end wall 512, and a second end wall 514. The tray 510 may extend along the length of the bracket 358, and the first end wall 512 and the second end wall 514 may extend generally perpendicular to the tray 510. The first end wall 512 may have a first hole 522 and the second end wall 514 may have a second hole 524.

As show in FIG. 5B, the first connector 362 may be secured to the first end wall 512 by a fastener 526, which may extend through the first hole 522 of the first end wall 512 and may be threadably received by the first connector 362. A bearing 528 may be seated in the second hole 524 of the second end wall 514 to receive the rod 366 in a manner that permits the rod 366 to slide relatively freely through the second hole 524 in the second end wall 514.

The bracket 358 may have a printed circuit board, or PCB 540 that resides in the tray 510 of the bracket 358. The PCB 540 may be secured to the tray 510 via fasteners 542, which may be screws, bolts, rivets, or the like. The PCB 540 may have conductive contacts 544, which may be arranged in a grid-like pattern on the surface of the PCB 540 that faces the slider 360. More specifically, the conductive contacts 544 may be arranged in a plurality of rows 546, each of which extends generally along the width of the PCB 540. Each of the conductive contacts 544 may be a plate, pin, or other projecting element formed of an electrically conductive material. FIG. 5B illustrates the presence of four of the conductive contacts 544 in each row 546; however, any other number of contacts may be present in a row 546. In alternative embodiments, the conductive contacts 544 may be arranged in a single line extending along the axis 500.

Each row 546 of the conductive contacts 544 may have the conductive contacts 544 arranged in a staggered pattern (i.e., with the conductive contacts 544 of each row 546 offset slightly along the axis 500 from each other). The offset between each pair of adjacent conductive contacts 544 of a row 546 may be equal. Further, if desired, the same offset may be applied between the conductive contacts 544 of adjacent rows 546 that are closest to each other along the axis 500. The offset may be equal to the measurement resolution of the sensor 326. Such a staggered pattern is present in the conductive contacts 544 of the PCB 540 of FIG. 5B.

For example, if the sensor 326 is to have a measurement resolution of 0.1 inches, each of the conductive contacts 544 of a row 546 may be offset from its neighbor(s) along the axis 500 by a distance of 0.1 inches. Further, the conductive contact 544 of a row 546 that is closest to the first end wall 512 may be offset by a distance of 0.1 inches from the conductive contact 544 that is furthest from the first end wall 512 of the row 546 that is adjacent to the first row 546, on the side toward the first end wall 512.

As shown, the slider 360 may have a block 550, a printed circuit board or PCB 552, and a brace 554. The block 550 may hold the PCB 552 in selective contact with the PCB 540 of the bracket 358, in order to carry out measurement, as will be described subsequently. The brace 554 may be secured to the block 550 to keep the block 550 and the PCB 552 in place on the bracket 358.

The block 550 may have a boss 560, which may be secured to the rod 366. If desired, the boss 560 may have a threaded hole or other attachment feature that facilitates attachment of the rod 366 to the boss 560. Further, the block 550 may have holes 562 that facilitate attachment of the block 550 to the brace 554. The PCB 552 may have holes 564, which may be used to secure the PCB 552 to the underside of the block 550 through the use of fasteners 566 or the like.

The brace 554 may have side plates with holes 568 spaced apart with spacing that matches that of the holes 562 of the block 550. Thus, the brace 554 may be secured to the block 550 through the use of fasteners 570 that pass through the holes 568 of the brace 554 and are received in the holes 562 of the block 550. The fasteners 570 may be screws, bolts, rivets, or the like. The brace 554 may be secured to the block 550 with the tray 510 between the bottom plate of the brace 554 and the block 550; thus, the tray 510 (and thence, the PCB 540) may be captured between the block 550 and the brace 554 as illustrated in FIG. 5A.

The rod 366 may have a shaft 580 and a sleeve 582. The shaft 580 may have threaded ends 584 that facilitate attachment of the shaft 580 to the boss 560 of the block 550, and to the second connector 364. The sleeve 582 may have a central passageway 586, which may be sized to receive the shaft 580. The sleeve 582 may be sized such that the spring 368 fits around the exterior of the sleeve 582.

Referring to FIG. 5C, a plan view illustrates the PCB 552 of the slider 360 of the displacement measurement device 310 of FIGS. 3A and 3B. As shown, the PCB 552 may have conductive contacts 590 arranged in a row, along the width of the PCB 552. The conductive contacts 590 may the same in number as the conductive contacts 544 of each row 546 of the PCB 540. Thus, each of the conductive contacts 590 may make contact with one of the conductive contacts 544 of each row 546 of the conductive contacts 544 of the PCB 540, as the slider 360 moves along the PCB 540.

Each of the conductive contacts 590 and/or each of the conductive contacts 544 may be connected to a dedicated electrical circuit that is closed when contact is made between the conductive contact 590 and the conductive contact 544. Closure of the circuit may be detected and recorded by circuitry on the PCB 540 and/or the PCB 552. The identity of the closed circuit may indicate which of the conductive contacts 544 of the PCB 540 is in contact with one of the conductive contacts 590 of the PCB 552, thereby indicating the position of the slider 360 on the bracket 358. This, in turn, may indicate the displacement between the first connector 362 and the second connector 364 of the sensor 326, thereby indicating the displacement between the first coupling 322 and the second coupling 324 of the displacement measurement device 310, which indicates the displacement between the first end 202 and the second end 204 of the core member 200 of the architectural brace 130.

The PCB 540 and the PCB 552 may optionally be electrically connected together via wires or the like. The displacement measurement device 310 may have other components like those shown and described in connection with the displacement measurement devices 110 of FIG. 1. If desired, the memory 144, the input/output module 146, the processor 148, the power source 150, and/or any other electrical component of the displacement measurement devices 110 of FIG. 1 may be located on the PCB 540 and/or the PCB 552.

Advantageously, the displacement measurement device 310 may be capable of measuring changes in displacement between the first end 202 and the second end 204 of the core member 200 across a relatively large range of displacements, enabling the displacement measurement device 310 to measure large deflections of the architectural brace 130. Further, in some embodiments, the displacement measurement device 310 may advantageously provide output in the form of strain in the architectural brace 130. In such embodiments, the output of the displacement measurement device 310 may, directly and without modification, indicate the strain in the architectural brace 130.

Further, the displacement measurement device 310 may advantageously provide output that indicates absolute displacement of the first end 202 relative to the second end 204. More specifically, some displacement transducers provide only changes in position; the output of such displacement transducers is heavily dependent upon the starting displacement. If the starting displacement changes without being measured, for example, when the displacement transducer is not powered on, the measurements taken from that point may not be accurate. Advantageously, the displacement measurement device 310 may measure absolute position. Specifically, determination of which of the conductive contacts 544 is in contact with one of the conductive contacts 590 may provide an indication of displacement that is independent of any previous measurement made by the sensor 326. The sensor 326 may still provide an indication of displacement changes, because the displacement between the first end 202 and the second end 204 of the core member 200 can be received before and after the change; these displacements may be compared to yield the displacement change.

In some embodiments, the sensor 326 may be designed to power on only in the event of a significant change in displacement between the first end 202 and the second end 204 of the core member 200. For example, the sensor 326 may have a dormant mode, in which the sensor 326 does not provide the measurement data 142, and an active mode, in which the sensor 326 generates and records the measurement data 142 as described previously. The sensor 326 may remain in the dormant mode under normal conditions. When a threshold displacement change, or a threshold displacement, is detected between the first end 202 and the second end 204 of the core member 200, the sensor 326 may transition from the dormant mode to the active mode. The threshold displacement may, for example, be selected such that, once the architectural brace 130 is secured to the adjacent architectural features, the sensor 326 is unlikely to transition to the active mode until the occurrence of a deformation inducing event.

In some embodiments (not shown), in place of the threshold displacement, other measurements, such as a threshold acceleration, may be used to transition the sensor 326 from the dormant mode to the active mode. In such embodiments, an accelerometer or other secondary sensor may be connected to the sensor 326 to provide the measurement that will trigger transition of the sensor 326 from the dormant mode to the active mode.

Further, the displacement measurement device 310 may advantageously be easily scalable in length to enable the displacement measurement device 310 to be easily adapted to architectural braces 130 of different lengths. For example, the first portion 332 and the second portion 334 of the housing 320 may be made in a variety of lengths, and in some embodiments. Similarly, the bracket 358, the rod 366, and the spring 368 may all be made in different lengths. Some of these components may be made via extrusion, by which individual components may be made to a desired length.

Yet further, the sensor 326 may be readily contained within the buckling restraining assembly 220 of the architectural brace 130, in a manner similar to that illustrated in FIGS. 2A and 2B, in connection with the displacement measurement device 110. The sensor 326 may be contained in the housing 320 as shown and described previously; the housing 320 may protect the sensor 326 from intrusion of particulate matter from the cement layer 222 of the restraining assembly 220. Containment of the sensor 326 in the interior of the restraining assembly 220 may advantageously keep the sensor 326 protected during transportation, storage, and/or installation of the architectural brace 130.

Like the displacement measurement device 110, the displacement measurement device 310 may be connected to an external device, such as the computing device 120 of FIG. 1, so that the computing device 120 can receive the measurement data 142 and/or other data recorded by the sensor 326. This connection may be wired and/or wireless. In the event a wired connection is used, the displacement measurement device 310 may have a connector (not shown), such as a USB or Ethernet connector, which may be accessible via an opening (not shown) in the housing 320 adjacent to the first coupling 322 or the second coupling 324. Thus, such a connector may be accessed through the aperture 234 of the end plate 232 of the casing 224 (shown in FIG. 2B). In the event that a wireless data connection is used, it may advantageously be designed to transmit the data through the restraining assembly 220 of the architectural brace 130.

In alternative embodiments, a displacement measurement device, such as the displacement measurement device 110 or the displacement measurement device 310, may be connected to an architectural brace 130 in a different manner. For example, the displacement measurement device 110 or the displacement measurement device 310 may be positioned outside the cement layer 222 and/or outside the buckling restraining assembly 220 of the architectural brace 130. Examples of such embodiments will be shown and described in connection with FIGS. 6 and 7.

Figure 6:
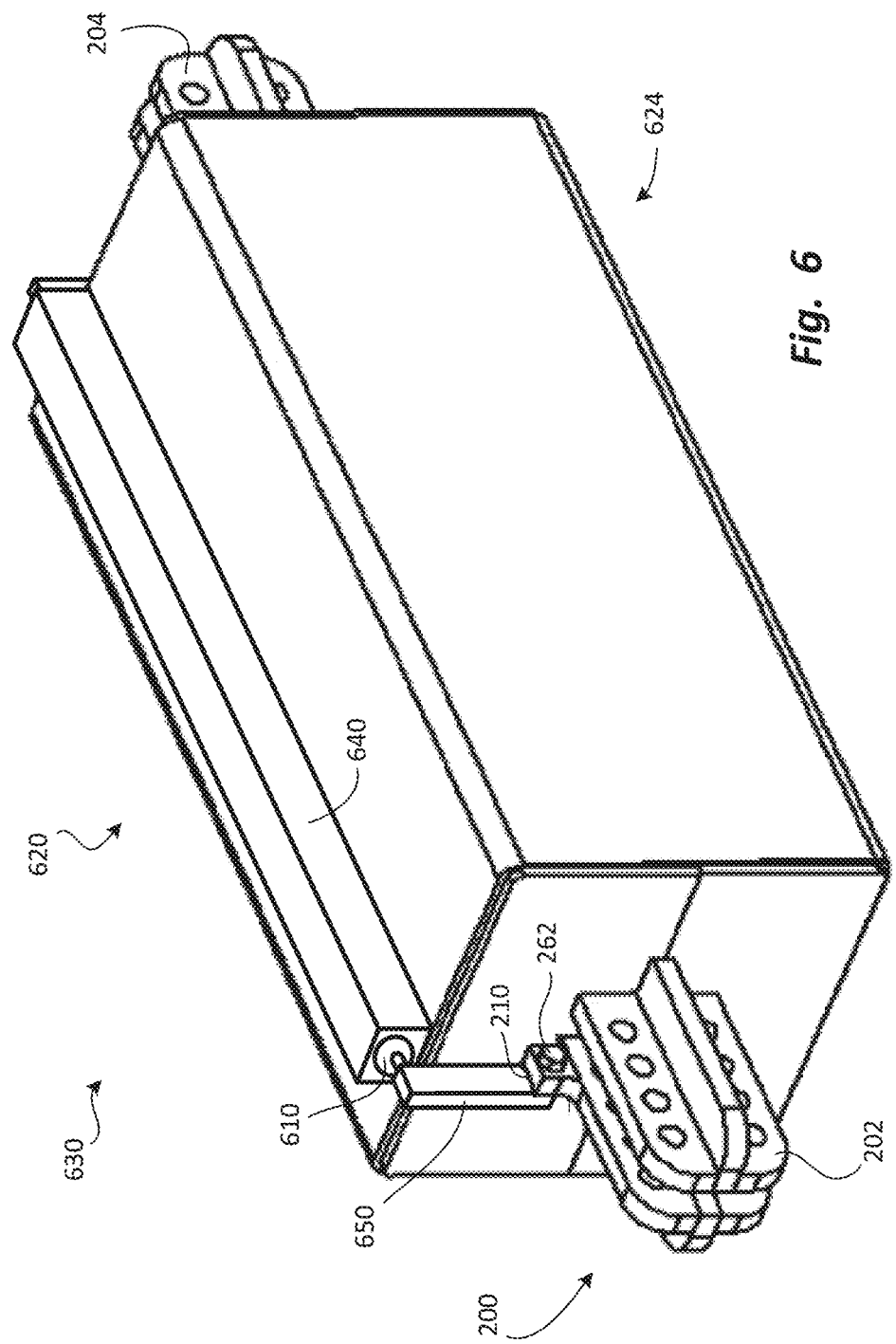
FIG. 6 is a perspective view of a displacement measurement device used to measure displacement in an architectural brace, with the displacement measurement device passing through a peripheral portion of the architectural brace, according to some embodiments.

Referring to FIG. 6, a perspective view illustrates a displacement measurement device 610 used to measure displacement in an architectural brace 630, with the displacement measurement device 610 passing through a peripheral portion of the architectural brace 630, according to one embodiment. The displacement measurement device 610 may optionally have a configuration similar to those of the displacement measurement device 310 and/or the displacement measurement device 110.

As shown, the architectural brace 630 may have a configuration similar to that of the architectural brace 130, with a core member 200 having a first end 202 and a second end 204, and a buckling restraining assembly 620 that restrains buckling of the core member 200. The buckling restraining assembly 620 may have a cement layer (not shown) that restrains buckling of the core member 200 and a casing 624 that keeps the cement layer in place.

Rather than passing through the interior of the cement layer, the displacement measurement device 610 may pass through a ridge 640 in the casing 624. The ridge 640 may optionally be isolated from the cement layer, for example, by a metal wall (not shown) of the casing 624 that separates the ridge 640 from the remainder of the space within the casing 624. In such a case, the displacement measurement device 610 may not need to have a housing like the housing 250 of the displacement measurement device 110 and the housing 320 of the displacement measurement device 310 because the metal wall and the ridge 640 may cooperate to isolate the displacement measurement device 610 from intrusion of particulate matter.

In the alternative, no such metal wall may be provided; rather, the displacement measurement device 610 may be adjacent to and/or in contact with the cement layer in the interior of the casing 624. In such an event, the displacement measurement device 610 may beneficially have a housing (not shown) like the housing 250 of the displacement measurement device 110 and/or the housing 320 of the displacement measurement device 310.

The displacement measurement device 610 may be coupled to the first end 202 and the second end 204 of the core member 200, or more specifically, to the device anchoring projections 210 of the first end 202 and the second end 204, by extension arms 650, through the use of fasteners 262. Thus, the displacement measurement device 610 may measure changes in displacement between the first end 202 and the second end 204 in a manner similar to that of the displacement measurement device 110 and/or the displacement measurement device 310. The ridge 640 may serve to protect the displacement measurement device 610 during storage, transportation, and/or installation of the architectural brace 630.

Figure 7:
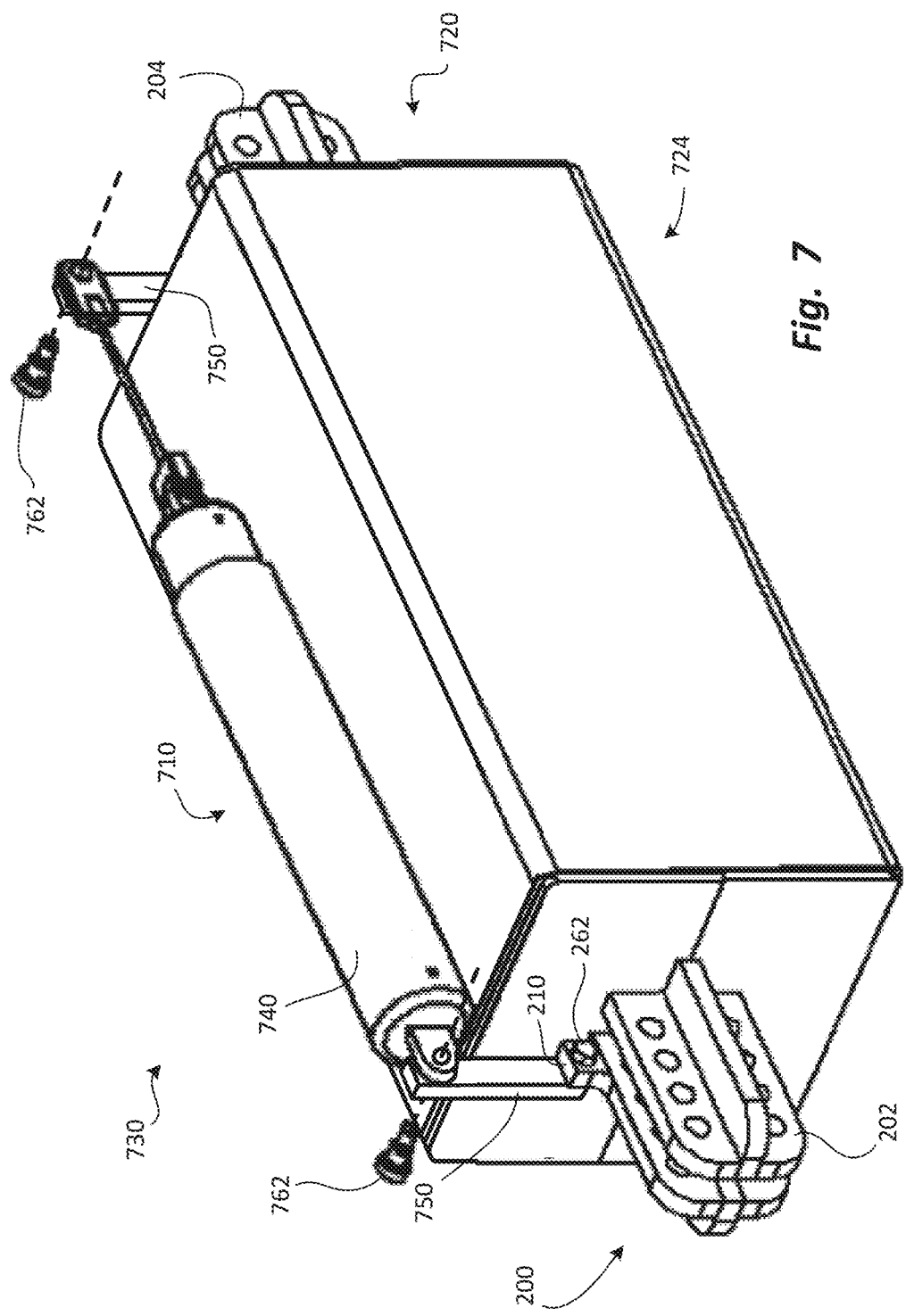
FIG. 7 is a perspective view of a displacement measurement device used to measure displacement in an architectural brace, with the displacement measurement device passing alongside the architectural brace, according to some embodiments.

FIG. 7 is a perspective view of a displacement measurement device 710 used to measure displacement in an architectural brace 730, with the displacement measurement device 710 passing alongside the architectural brace 730, according to one embodiment. The displacement measurement device 710 may optionally have a configuration similar to those of the displacement measurement device 310 and/or the displacement measurement device 110. As shown, the architectural brace 730 may have a configuration similar to that of the architectural brace 130, with a core member 200 having a first end 202 and a second end 204, and a buckling restraining assembly 720 that restrains buckling of the core member 200. The buckling restraining assembly 720 may have a cement layer (not shown) that restrains buckling of the core member 200 and a casing 724 that keeps the cement layer in place.

Rather than passing through the interior of the cement layer, the displacement measurement device 710 may be positioned adjacent to the casing 724, parallel to the architectural brace 730. The displacement measurement device 710 may optionally be in contact with the casing 724, or may be offset some distance from the casing 724. The displacement measurement device 710 may beneficially have a housing 740 like the housing 250 of the displacement measurement device 110 and/or the housing 320 of the displacement measurement device 310. Although the displacement measurement device 710 may be protected from intrusion of particulate matter from the cement layer by virtue of the casing 724, the housing 740 of the displacement measurement device 710 may help to isolate the interior components of the displacement measurement device 710 from other solid matter, such as dust, that could otherwise interfere with the operation of the displacement measurement device 710.

The displacement measurement device 710 may be coupled to the first end 202 and the second end 204 of the core member 200, or more specifically, to the device anchoring projections 210 of the first end 202 and the second end 204, by extension arms 750, through the use of fasteners 262 and/or fasteners 762. Thus, the displacement measurement device 710 may measure changes in displacement between the first end 202 and the second end 204 in a manner similar to that of the displacement measurement device 110 and/or the displacement measurement device 310.

Positioning of the displacement measurement device 710 adjacent to the architectural brace 730 may facilitate attachment of the displacement measurement device 710 to the architectural brace 730 after the architectural brace 730 has been manufactured and/or connected to architectural elements. Thus, the displacement measurement device 710 may be retrofitted to an existing architectural brace that has already been installed in a building.

Figure 8A:
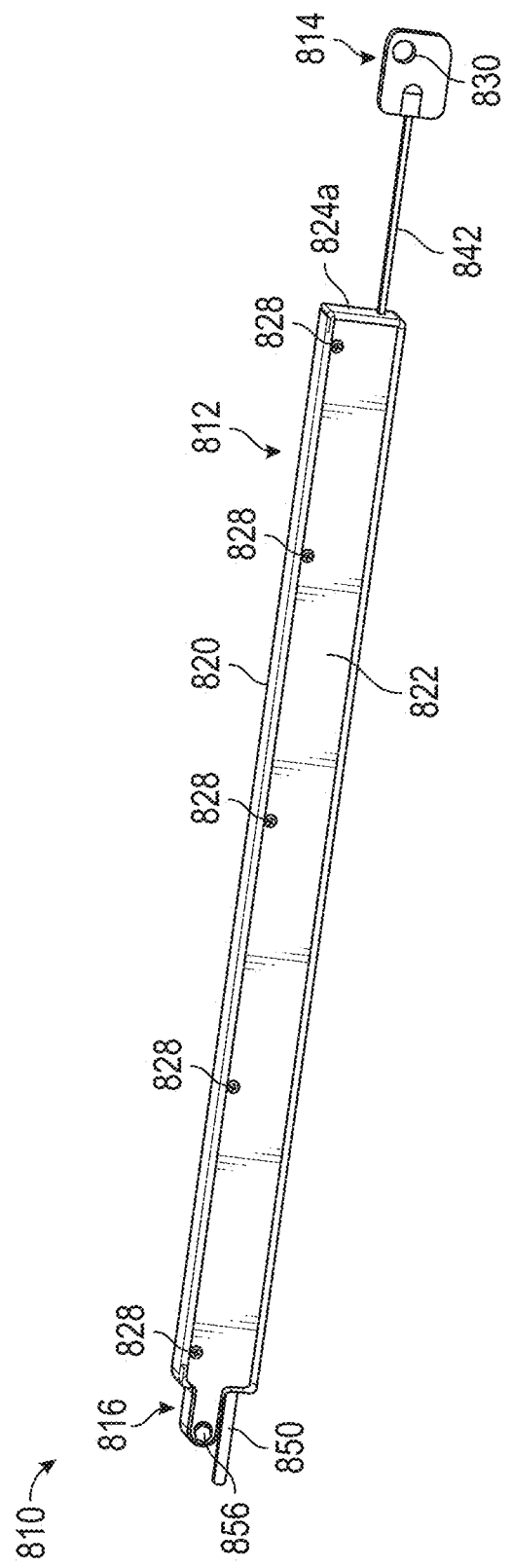
FIG. 8A is a top view of another example displacement measurement device, according to some embodiments.
Figure 8B:
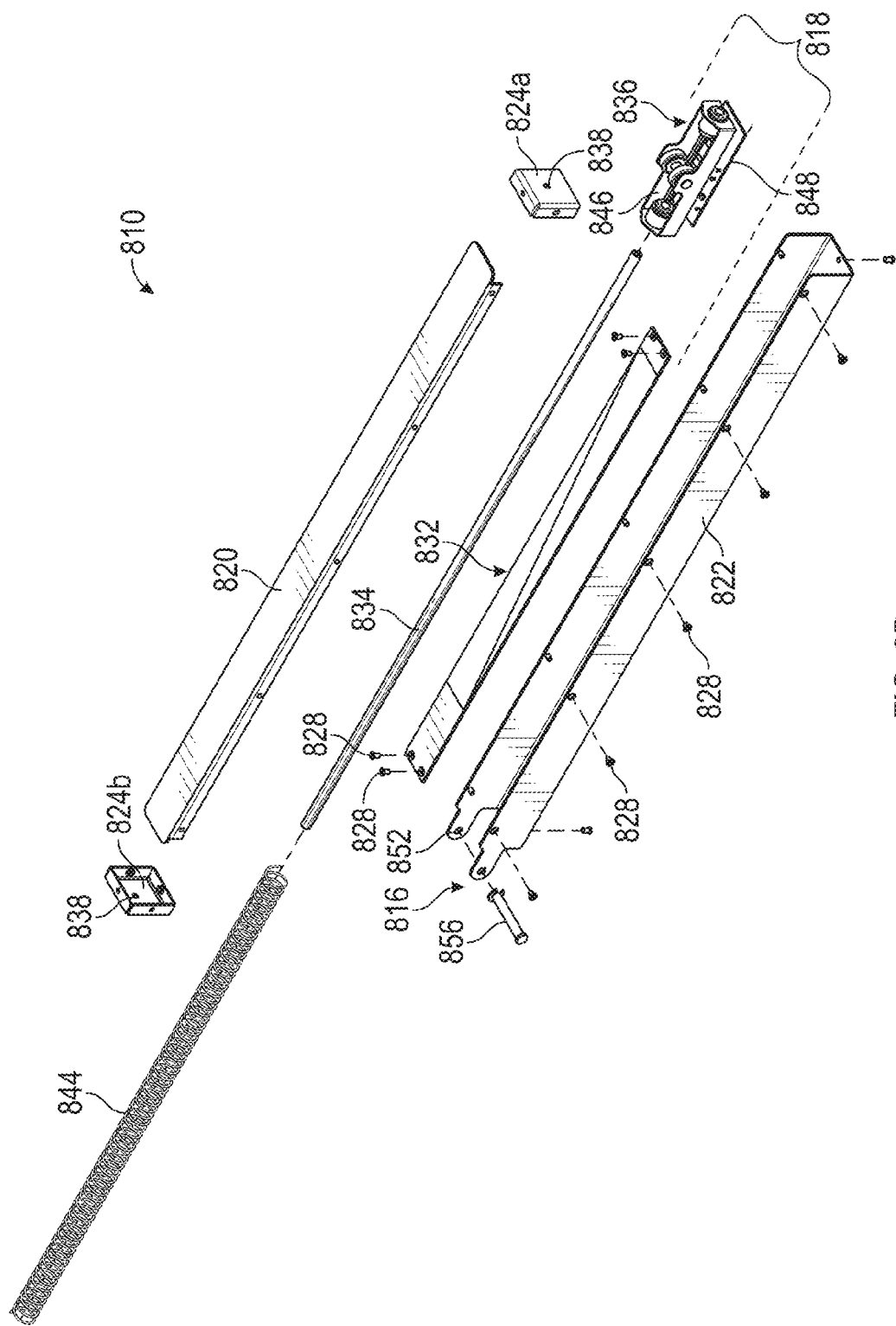
FIG. 8B is an exploded view of a portion of the displacement measurement device of FIG. 8A, according to some embodiments.
Figure 8C:
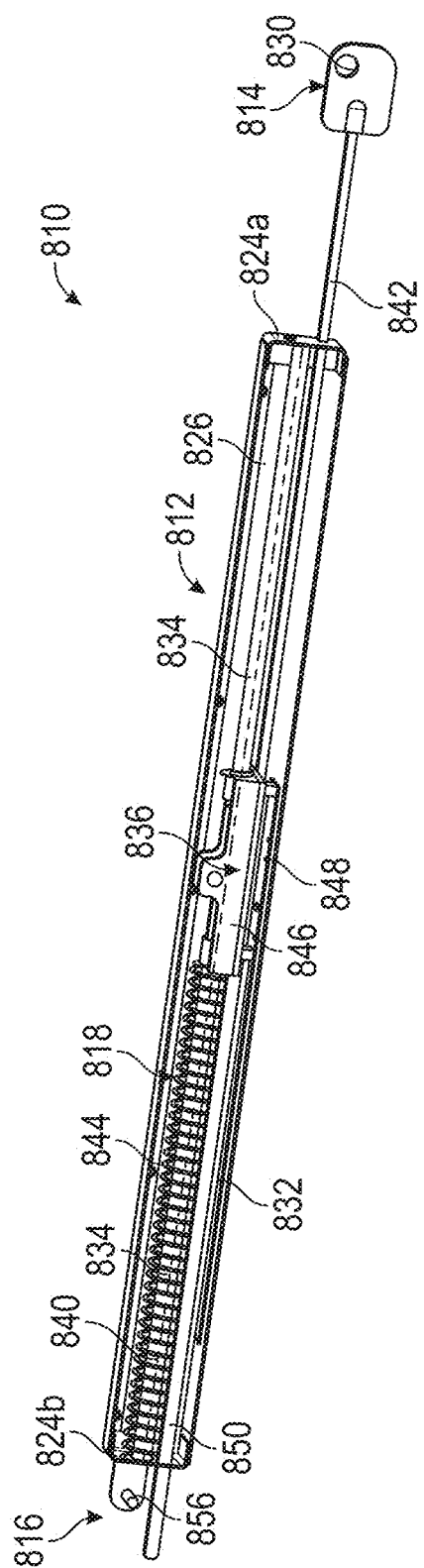
FIG. 8C is a cutaway view of the displacement measurement device of FIG. 8A, according to some embodiments.

Another displacement measurement device will be illustrated and described in connection with FIGS. 8A-8F, as follows. FIGS. 8A-8C illustrate a displacement measurement device 810 according to some embodiments. In some embodiments, the displacement measurement device 810 may be installed and used to measure displacement caused by strain in an architectural brace such as the architectural brace 130 of FIGS. 2A and 2B, in a manner similar to that of the displacement measurement device 110 or the displacement measurement device 310.

As illustrated in FIGS. 8A-8C, in some embodiments, the displacement measurement device 810 may include a housing 812, a first coupling 814, a second coupling 816, and a displacement sensor 818. In some embodiments, the housing 812 may be designed to contain and protect the displacement sensor 818 from intrusion of foreign matter, such as particulates from the cement layer 222. In some embodiments, the first coupling 814 may be secured to the first end of an architectural brace such as the architectural brace 130 of FIGS. 2A-2B and FIG. 8F, and the second coupling 816 may be secured to the second end of an architectural brace, such as the architectural brace 130 of FIGS. 2A-2B and FIG. 8F. In some embodiments, the displacement sensor 818 may detect changes in the displacement between the first coupling 814 and the second coupling 816 in order to assess displacement in the architectural brace 130.

In some embodiments, the housing 812 may include one or more of the following: a first portion 820, a second portion 822, a first end plate 824a, and a second end plate 824b. The first end plate 824a and the second end plate 824b may be referred to hereinafter as "end plates 824." In some embodiments, the first portion 820, the second portion 822, and the end plates 824 may be coupled together in such a manner that a cavity 826 is defined in the interior of the first portion 820, the second portion 822, and the end plates 824 of the housing 812. In some embodiments, the first portion 820, the second portion 822, and the end plates 824 may fit together in such a manner that the cavity 826 is protected from intrusion of foreign matter, such as particulate matter from the cement layer 222.

In some embodiments, one or more of the first portion 820, the second portion 822, and the end plates 824 may be coupled together using one or more screws 828, bolts, nuts, or any other suitable coupling mechanism. In some embodiments, the first portion 820, the second portion 822, and the end plates 824 may be coupled together in such a manner that a seal is provided between the first portion 820, the second portion 822, and the end plates 824. However, in some embodiments, this seal need not be hermetic, but may rather only be sufficient to substantially prevent entry of solid matter into the cavity 826 in order to prevent such solid matter from interfering with the operation of the displacement sensor 818. The housing 812 may include multiple pieces as illustrated, for example, in FIGS. 8A-8C, which may facilitate access to components inside the housing 812. Alternatively, in some embodiments, the housing 812 may be integrally formed in a single, monolithic piece.

In some embodiments, the first coupling 814 and the second coupling 816 may be configured to be secured to the ends of a core member of an architectural brace, such as the first end 202 and the second end 204 of the core member 200 of the architectural brace 130. In some embodiments, the first coupling 814 and the second coupling 816 may thus each have an attachment feature that facilitates such securement. For example, the first coupling 814 may include an attachment feature in a form of a fastening hole 830 through which a fastener, such as a screw, bolt, or rivet can pass to secure the first coupling 814 to the first end 802.

The displacement sensor 818 may be of a type specifically designed for measurement of the deflections that occur in architectural braces. In some embodiments, the displacement sensor 818 may include a printed circuit board ("PCB") 832 that resides in the housing 812. In some embodiments, the PCB 832 may be secured to the second portion 822 of the housing 812 using the screws 828, bolts, nuts, or any other suitable coupling mechanism. In some embodiments, the PCB 832 may include or correspond to the PCB 540, illustrated in FIG. 5B according to some embodiments.

In some embodiments, the displacement sensor 818 may include a stationary rod 834 and a shuttle, trolley, or slider 836 that rides on the stationary rod 834. In some embodiments, the rod 834 may extend through the slider 836, and the slider 836 may move or slide along the rod 834 and relative to the housing 812 and/or the PCB 832. In some embodiments, the rod 834 may include a sleeve (not illustrated in FIGS. 8A-8C) and/or a shaft. In some embodiments, the end plates 824 may each include an indent or hole 838 sized and configured to receive ends of the rod 834. Thus, the rod 834 may be secured to the housing 812. In some embodiments, the ends of the rod 834 may be coupled with the housing 812 in an interference fit. In some embodiments, the shaft may have threaded ends that facilitate attachment of the shaft to the holes 838. In some embodiments, the shaft may be coupled with the housing 812 via an adhesive or epoxy. In some embodiments, the rod 834 may be oriented along an axis 840, which may correspond to the axis 500. In some embodiments, the rod 834 may extend parallel to a length of the housing 812 and/or the architectural brace 130.

In some embodiments, the slider 836 may be coupled with a support cable 842, which may be coupled with the first coupling 814 in any suitable manner. In some embodiments, the support cable 842 may be threadably received by the first coupling 814. In some embodiments, the support cable 842 may extend through the hole 838 in the end plate 824a or through another hole in the end plate 824a.

In some embodiments, the displacement sensor 818 may include a spring 844, which may be positioned to encircle the rod 834. In some embodiments, a first end of the spring 844 may be secured to an end of the slider 836 and a second end of the spring 844 may be secured to the housing 812. In some embodiments, the displacement sensor 818 may function by detecting the position of the slider 836 on the PCB 832. In some embodiments, the spring 844 may help the slider 836 to move to a neutral position on the PCB 832 in the absence of force moving the slider 836 to a different position. In one embodiment, the spring 844 overcomes gravity to maintain a neutral position of the slider 836 on the PCB 832.

Relative motion between the architectural elements may cause the first end 202 and the second end 204 of the core member 200 to move relative to each other. This motion may be replicated in the first coupling 814 and the second coupling 816 of the displacement measurement device 810. Relative motion between the first coupling 814 and the second coupling 816 may cause the slider 836 to move along the rod 834 and a position of the slider 360 with respect to the PCB 832 to change. For example, in some embodiments, in response to the core member 200 receiving a tension loading pattern and the first end 202 and the second end 204 moving apart from each other, the first coupling 814 and the second coupling 816 may also move apart from each other. Also, the tension on the support cable 842 may increase and the spring may stretch or become longer, causing the slider 836 to move in a first direction with respect to the PCB 832.

As another example, in some embodiments, in response to the core member 200 receiving a compression loading pattern and the first end 202 and the second end 204 moving towards each other, the first coupling 814 and the second coupling 816 may also move towards each other. Also, the tension on the support cable 842 may decrease and the spring may retract or become shorter, causing the slider 836 to move in a second direction with respect to the PCB 832, the second direction being opposite the first direction.

Figure 5:
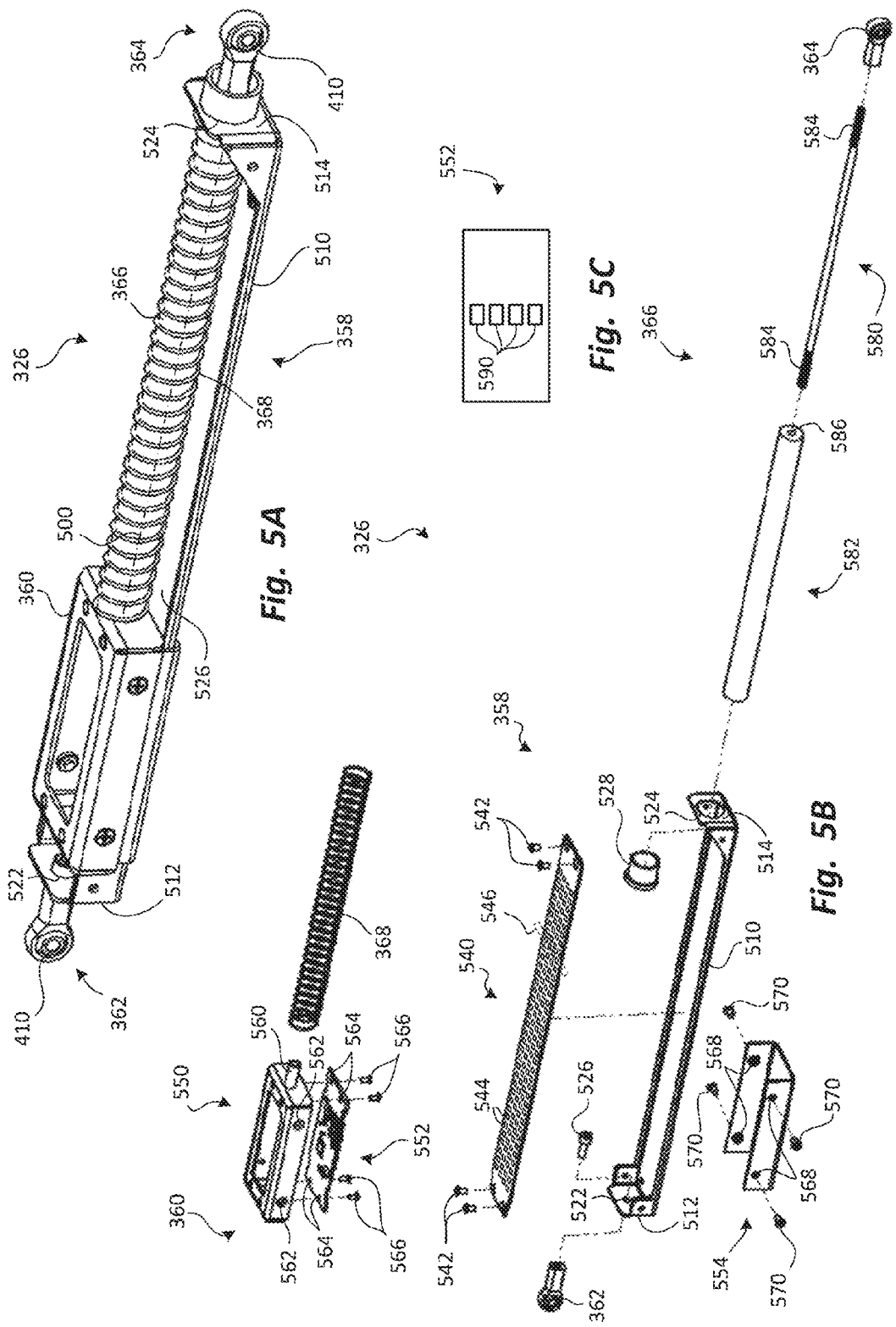
FIGS. 5A and 5B are perspective and exploded perspective views, respectively, of the sensor of the displacement measurement device of FIGS. 3A and 3B, according to some embodiments.
FIG. 5C is a plan view of the PCB of the slider of the displacement measurement device of FIGS. 3A and 3B, according to some embodiments.

In some embodiments, the slider 836 may include a block 846 and a printed circuit board or PCB 848, which may correspond to PCB 552 of FIGS. 5B-5C. In some embodiments, the block 846 may hold the PCB 848 in selective contact with the PCB 832, which may allow the displacement sensor 818 to detect a position of the slider 836 with respect to the PCB 832 and carry out measurement, as described with respect to FIG. 5. For example, conductive contacts of the PCB 848 and conductive contacts of the PCB 848 may be connected to a dedicated electrical circuit that is closed when contact is made between conductive contacts of the PCB 848 and conductive contacts of the PCB 848. Closure of the circuit may be detected and recorded by circuitry on the PCB 848 and/or the PCB 832. The identity of the closed circuit may indicate which of the conductive contacts of the PCB 540 is in contact with one of the conductive contacts of the PCB 552, thereby indicating the position of the slider 836 with respect to the PCB 832 and/or the rod 834. This, in turn, may indicate the displacement between the first coupling 814 and the second coupling 816 of the displacement measurement device 810, which may indicate the displacement between the first end 202 and the second end 204 of the core member 200 of the architectural brace 130.

In some embodiments, the displacement measurement device 810 may include a communication cable 850 that connects the displacement sensor 818 to the power source 150 and/or allows data transmission. In some embodiments, a first end of the communication cable 850 may be electrically coupled with the PCB 832 and/or the PCB 848, and a second end of the communication cable 850 may be electrically coupled with the power source 150. In some embodiments, the communication cable 850 may include multiple wires. In some embodiments, the communication cable 850 may extend through the hole 838 in the end plate 824b or another hole in the end plate 824b. In some embodiments, the communication cable 850 may be configured to allow the slider 836 to move along the rod 834. For example, the communication cable 850 may be flexible and/or compliant. In some embodiments, the communication cable 850 may be coiled.

In some embodiments, the PCB 832 and the PCB 848 may optionally be electrically connected together via wires, electrical leads, electrical contacts, or the like. The displacement measurement device 810 may have other components like those shown and described in connection with the displacement measurement devices 110 or the displacement measurement device 310. In some embodiments, one or more of the memory 144, the input/output module 146, the processor 148, the power source 150, and any other electrical component of the displacement measurement device 110 of FIG. 1 may be located on the PCB 832 and/or the PCB 848.

In some embodiments, the displacement measurement device 810 may include or correspond to the displacement measurement device 110 of FIG. 1 and/or the displacement measurement device 310 of FIGS. 3-5. For example, in some embodiments, the displacement sensor 818 may include or correspond to the displacement sensor 140 of FIG. 1 and/or the displacement sensor 326 of FIGS. 3-5. Thus, the displacement sensor 818 may be designed to power on only in the event of a significant change in displacement between the first end 202 and the second end 204 of the core member 200. In some embodiments, the displacement sensor 818 may have a dormant mode in which the displacement sensor 818 does not provide the measurement data 142, and an active mode in which the displacement sensor 818 generates and records the measurement data 142, as described previously. The displacement sensor 818 may remain in the dormant mode under normal conditions. When a threshold displacement change or a threshold displacement is detected between the first end 202 and the second end 204 of the core member 200, the displacement sensor 818 may transition from the dormant mode to the active mode. The threshold displacement may, for example, be selected such that once the architectural brace 130 is secured to the adjacent architectural features, the displacement sensor 818 is unlikely to transition to the active mode until the occurrence of a deformation inducing event.

Figure 8D:
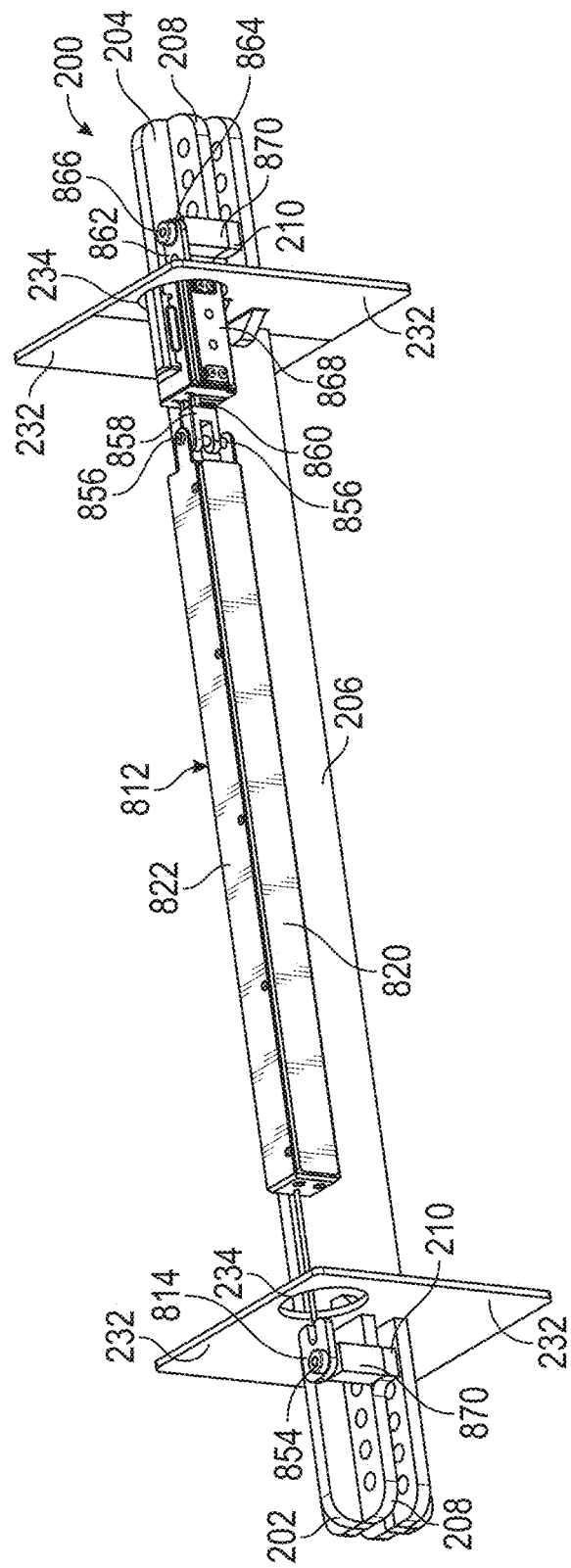
FIG. 8D is an upper perspective view of the displacement measurement device of FIG. 8A coupled with an example core member, according to some embodiments.
Figure 8E:
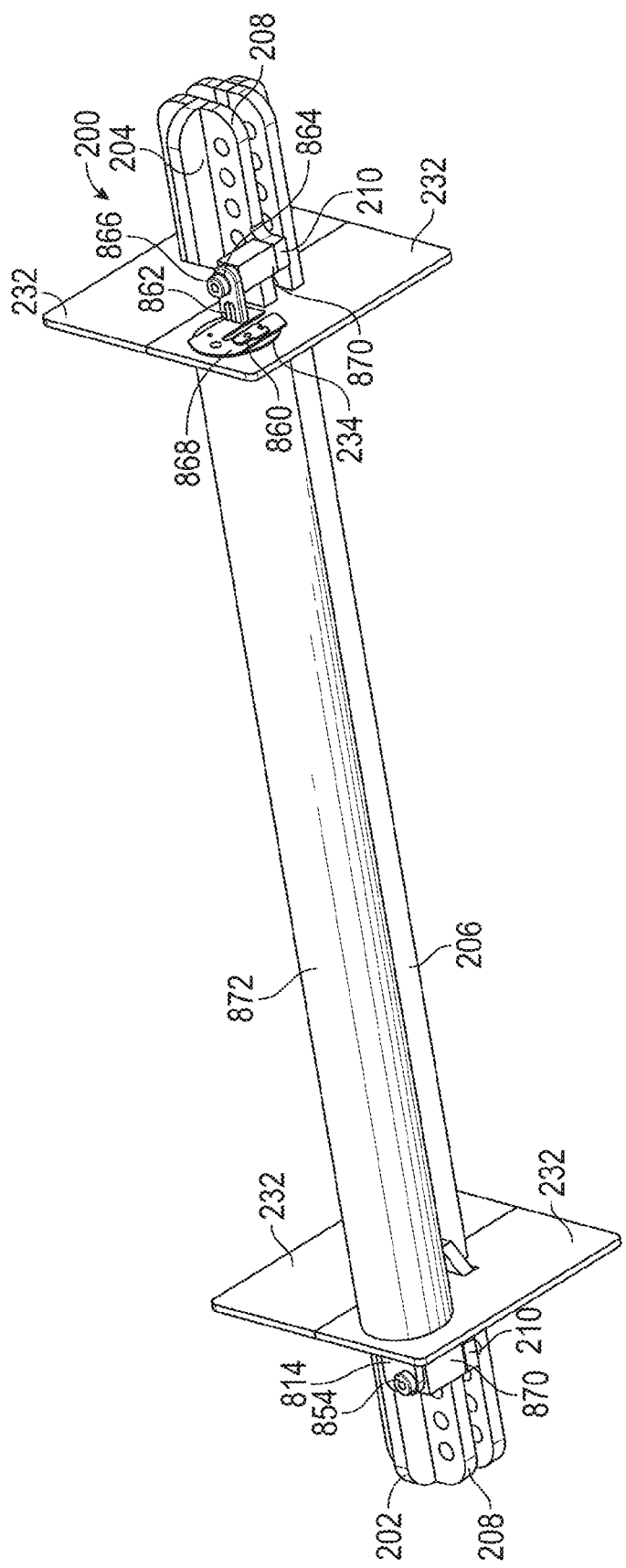
FIG. 8E is an upper perspective view of the displacement measurement device of FIG. 8A coupled with the core member and disposed within an example tubular wall, according to some embodiments.
Figure 8F:
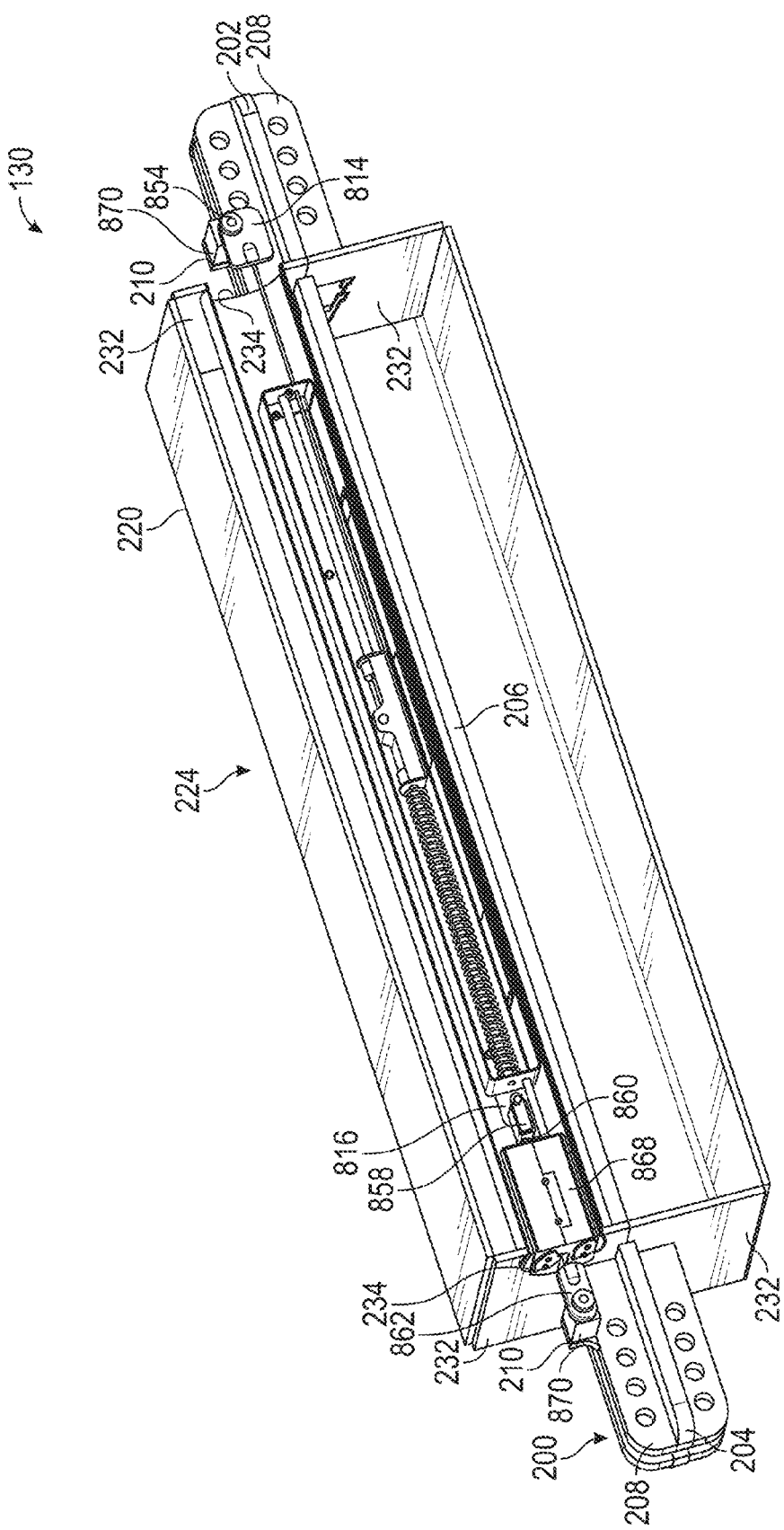
FIG. 8F is a cutaway view of the displacement measurement device of FIG. 8A coupled with the core member and disposed within the tubular wall and an example casing, according to some embodiments.

Each of the first coupling 814 and the second coupling 816 may include an attachment feature that facilitates attachment to the associated one of the first end 202 and the second end 204. In some embodiments, the first coupling 814 may include an attachment feature in the form of the one or more fastening holes 830. In some embodiments, the second coupling 816 may include an attachment feature in the form of one or more apertures 852. Referring now to FIGS. 8D-8F, the fastening hole 830 of the first coupling 814 may facilitate attachment of the first coupling 814 to the first end 202, or more specifically, to the device anchoring projection 210 of the first end 202, through the use of a fastener 854 such as a screw, bolt, or rivet that passes through the aperture 830 and through a corresponding hole in the device anchoring projection 210 of the first end 202.

In some embodiments, the second coupling 816 may include an attachment feature in the form of a fastening hole similar to the fastening hole 830, and through which a fastener, such as a screw, bolt, or rivet can pass to secure the second coupling 816 to the second end 204. Alternatively, as illustrated in FIGS. 8D-8F, in some embodiments the second coupling 816 may include an attachment feature in the form of the apertures 852 through which a fastener 856 such as a screw, bolt, or rivet can pass to secure the second coupling 816 to a connector element 858.

In some embodiments, the connector element 858 may include a rod 860 and a third coupling 862. In some embodiments, the third coupling 862 may include an attachment feature in the form of a fastening hole 870 through which a fastener 866, such as a screw, bolt, or rivet can pass to secure the connector element 858 to the second end 204. Thus, in these embodiments, the attachment feature of the second coupling 816 may be securable to the second end 204 of the core member 200 via the connector element 858. In some embodiments, the connector element 858 may extend through a channel or groove in a battery pack 868 or another power source 150. In some embodiments, the rod 860 of the connector element 858 may be threadably received by the third coupling 862.

The first and second couplings 814, 816 may be secured to the first end 202 and the second end 204, respectively, in any number of ways such that movement of the first end 202 and the second end 204 relative to each other is replicated in the first coupling 814 and the second coupling 816 of the displacement measurement device 810.

In some embodiments, the displacement measurement device 810 may be positioned at a desired offset from the core member 200 by a pair of spacing blocks 870 positioned between the first coupling 252 and the device anchoring projection 210 of the first end 202 of the core member 200, and between the third coupling 862 and the device anchoring projection 210 of the second end 204 of the core member 200. Thus, the displacement measurement device 810 may be sufficiently displaced from the core member 200 to enable the core member 200 to avoid interference with the operation of the displacement measurement device 810, even as the core member 200 undergoes significant deflection.

As illustrated in FIG. 8E, in some embodiments, the displacement measurement device 810 may be disposed within a tubular wall 872 which may form a cavity. In some embodiments, the cavity may be cylindrical and may correspond to the cavity 240 illustrated in FIG. 2B. The casing 224 is removed in FIGS. 8D and 8E for illustrative purposes.

Figure 9A:
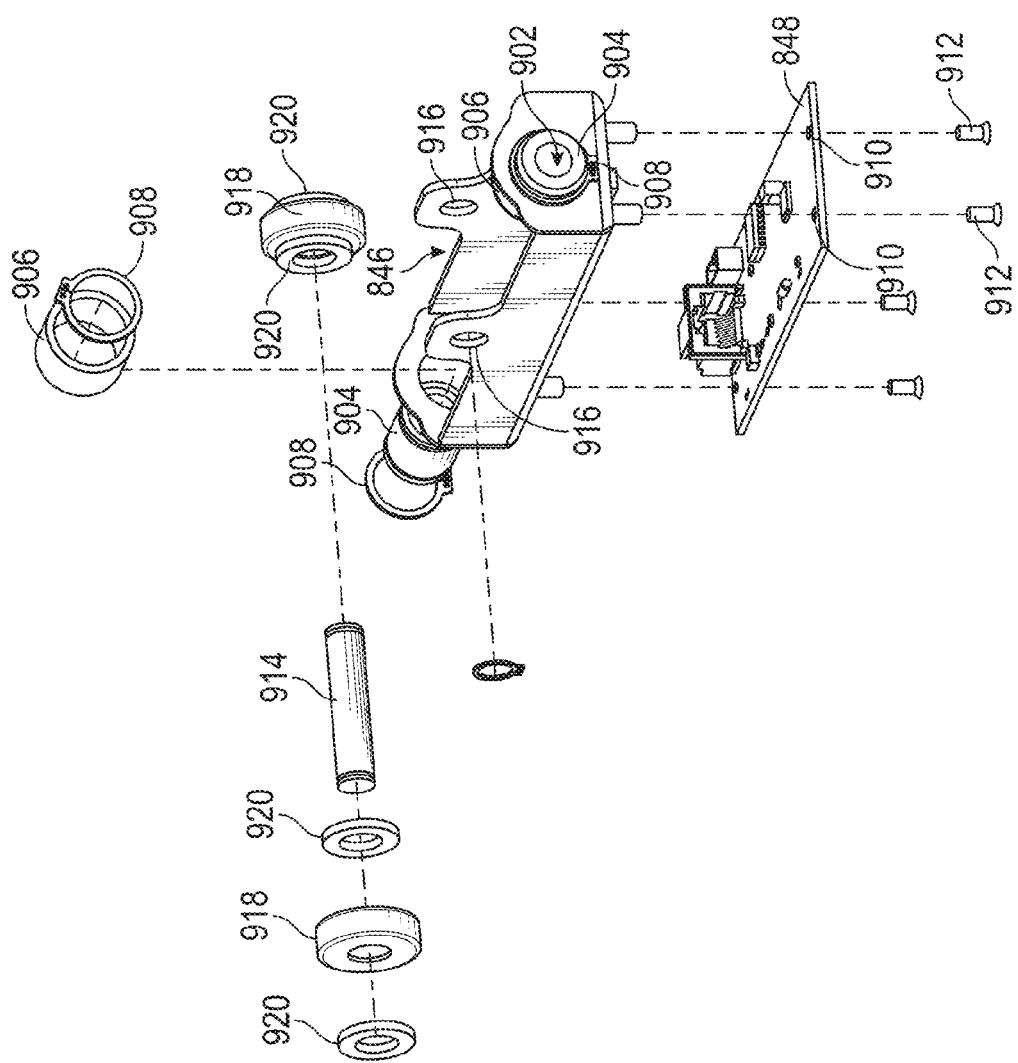
FIG. 9A is an upper perspective view of an example slider, according to some embodiments.
Figure 9B:
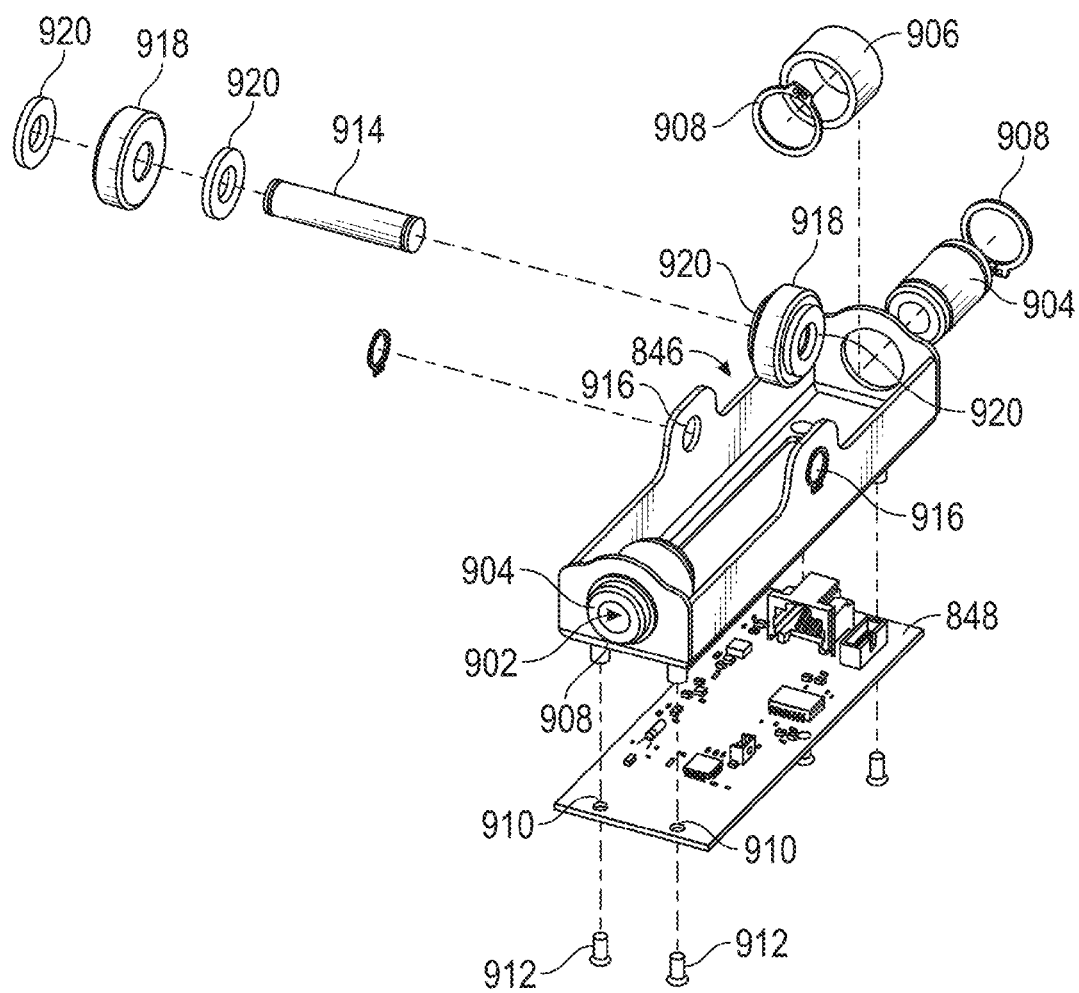
FIG. 9B is another upper perspective view of the slider, according to some embodiments.

Referring now to FIGS. 9A-9B, in some embodiments, first and second end walls of the block 846 may each include a hole 902, through which the rod 834 may extend. In some embodiments, a bearing 904 may be seated in one or more of the holes 902, which may decrease friction and allow the hole 902 to receive the rod 834 in a manner that permits the rod 834 to slide relatively freely through the hole 902. In some embodiments, the bushing 904 may fit inside a spacer element or bushing 906 disposed inside the block 846 and/or may be secured in the hole 902 via one or more ring clips 908.

In some embodiments, the PCB 848 may have one or more holes 910, which may be used to secure the PCB 848 to the underside of the block 846 through the use of screws 912, bolts, nuts, or any other suitable coupling mechanism.

In some embodiments, the block 846 may include a roller bearing 914, which may extend across the block 846 and contact the rod 834. In some embodiments, the roller bearing 914 may reduce lifting of the slider 836 from the PCB 832. In some embodiments, the roller bearing 914 may also guide or stabilize the rod 886. Thus, in some embodiments, the rod 886 may be guided by the roller bearing 914 and/or the bushings 904.

In some embodiments, the roller bearing 914 may include a shaft and/or may be coupled with the block 846 via opposing holes 916 in the block 846. In some embodiments, one or more bushings 918, bearings, ring clips, and/or washers 920 may be disposed on the roller bearing 914 to reduce friction and/or secure the roller bearing 914 in the opposing holes 916. In some embodiments, the roller bearing 914 may be disposed perpendicular to the rod 834.

Figure 10A:
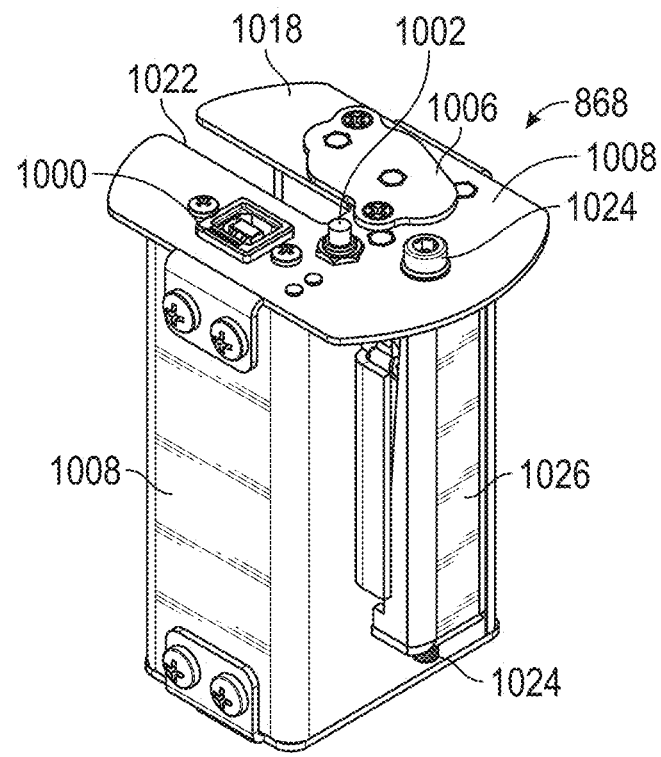
FIG. 10A is an upper perspective view of an example battery pack, according to some embodiments.
Figure 10B:
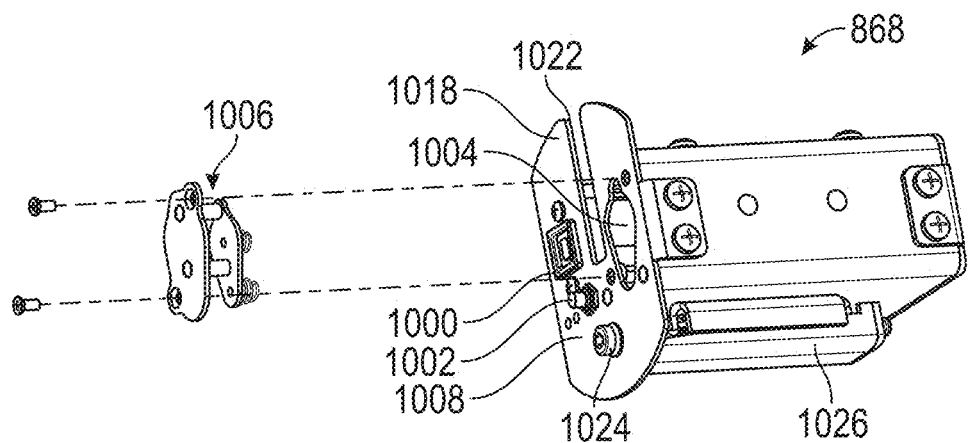
FIG. 10B is a side view of the battery pack of FIG. 10A, according to some embodiments.
Figure 10C:
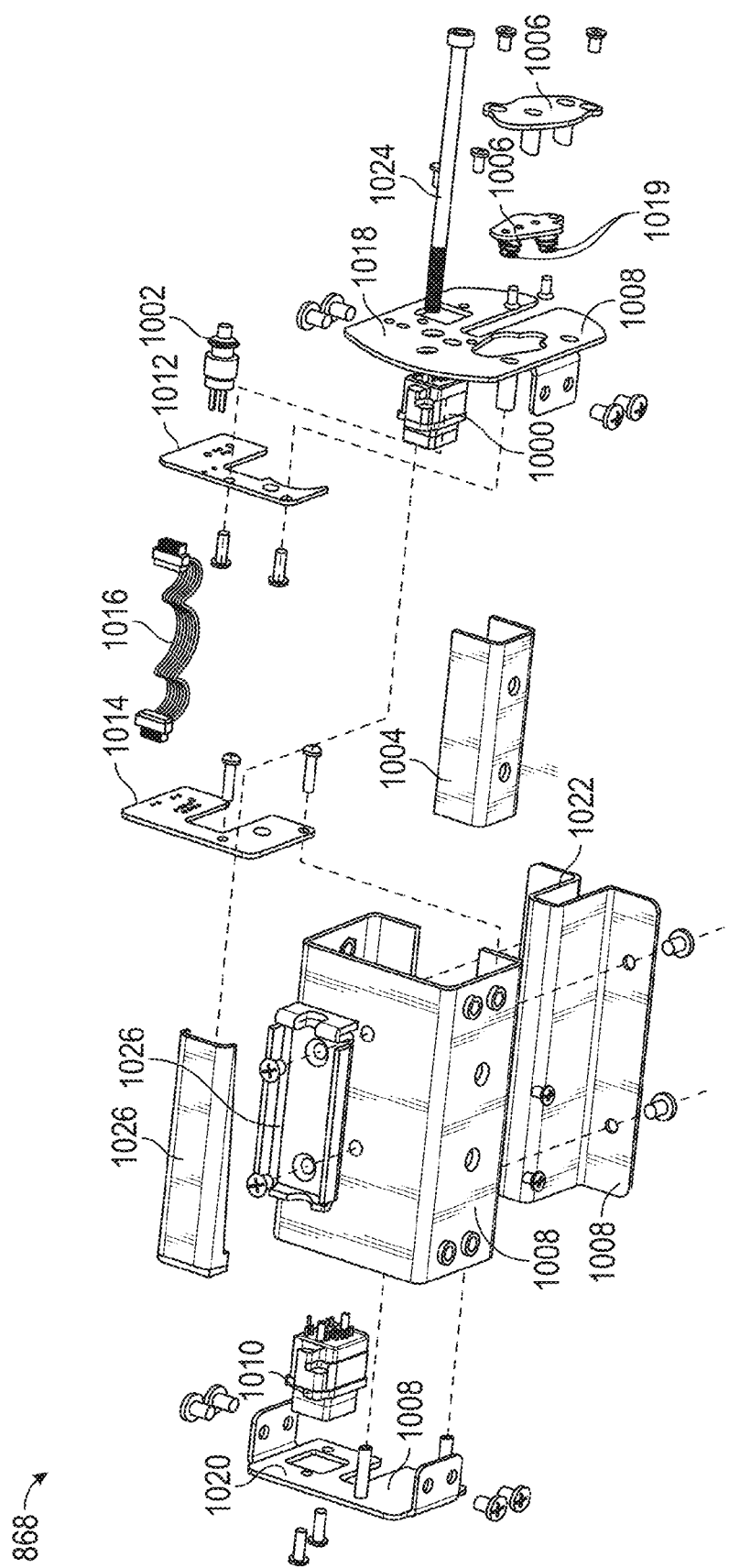
FIG. 10C is an exploded view of the battery pack of FIG. 10A, according to some embodiments.

Referring now to FIGS. 10A-10C, in some embodiments, the power source 150 of the displacement measurement device 810 may include one or more batteries, which may be housed in the battery pack 868 of the displacement measurement device 810 and which may provide electrical power to the displacement sensor 818. The batteries may be of any type known in the art, including but not limited to alkaline batteries, Nickle Metal Hydride (NiMH) batteries, Lithium Ion (Li-ion) batteries, and/or the like. In some embodiments, the batteries may include rechargeable batteries that can be charged through the use of wired and/or wireless charging, such as inductive charging. Advantageously, the batteries may be long-life batteries, which may allow the displacement measurement device 810 to be untouched for at least 5 to 10 or 10 to 15 years.

In some embodiments, the battery pack 868 may include one or more of the following: a USB port 1000, a status indicator 1002, a battery compartment 1004, a battery door 1006, a battery pack housing 1008, a communication cable connector 1010, a first circuit board 1012, and a second circuit board 1014. The battery pack 868 may be disposed at various locations. As illustrated in FIGS. 8D-8F, in some embodiments, the battery pack 858 may be disposed between the second coupling 816 and the second end 204 and/or proximate the connector element 858. The housing 1008 may be configured to house and protect one or more components of the battery pack 868.

In some embodiments, the first and second circuit boards 1012, 1014 may be spaced apart in the battery pack 868 and electrically connected via any suitable means, such as a ribbon cable 1016. In some embodiments, one or more of the following may be included on the first circuit board 1012 and/or the second circuit board 1014: the input/output module 146, the measurement data 142, the memory 144, and the processor 148. In some embodiments, one or more status indicators 1002 may be electrically coupled with the first circuit board 1012, which may be disposed closer to the second end 204 of the core member 200 than the second circuit board 1014. Although FIG. 10C illustrates two circuit boards, the battery pack 868 may include any number of circuit boards.

In some embodiments, the status indicator 1002 may include an LED light. Additionally or alternatively, in some embodiments, the status indicator 1002 may include a push button. In response to the push button being pushed by a user, a status of the batteries may be displayed to the user using, for example, an LED light. In some embodiments, the status indicator 1002 may extend through a first end 1018 of the housing 1008. In some embodiments, the USB port 1000 may also extend through the first end 1018 of the housing 1008. The USB port 1000 may facilitate transfer of the measurement data 142, which may be stored in the memory 144.

In some embodiments, the battery compartment 1004 may be configured to hold one or more batteries. For example, the battery compartment 1004 may hold two batteries. In some embodiments, the batteries may be arranged in parallel for increased capacitance and longer battery life. In some embodiments, the battery door 1006 may be configured to close an outer opening to the battery compartment 1004 through which the batteries may be inserted. In some embodiments, an inner surface of the battery door 1006 may include one or more battery contacts. In some embodiments, the inner surface of the battery door 1006 may include two spring contacts 1019.

In some embodiments, a first end of the communication cable connector 1010 may be electrically coupled with an end of the communication cable 850, and a second end of the communication cable connector 1010 may be electrically coupled with a circuit board, such as, for example, the second circuit board 1014. In some embodiments, the communication cable 850 and/or the communication cable connector 1010 may extend through an opening in a second end 1020 of the housing 1008.

In some embodiments, the housing 1008 may include one or more pieces that may be coupled together using one or more screws, bolts, nuts, or any other suitable coupling mechanism. Although not illustrated in FIG. 10C, alternatively, the housing 1008 may be integrally formed in a single, monolithic piece. In some embodiments, the housing 1008 may include a channel or groove 1022 through which the rod 860 of the connector element 858 may extend.

In some embodiments, the battery pack 868 may be secured to the tubular wall 872, illustrated in FIG. 8E, in any number of ways suitable to support the battery pack 868. In some embodiments, an elongated element 1024 may extend parallel to the housing 1008 along at least a portion of a length of the housing 1008. In some embodiments, an end of the elongated element may include one or more threads. In some embodiments, the elongated element 1024 may include a screw, bolt, nut, etc. In some embodiments, at least a portion of the elongated element 1024 may be enclosed in an encasing 1026 of the housing 1008. In some embodiments, the encasing 1026 and/or the elongated element 1024 may wedge the battery pack 868 in place and/or may press against the tubular wall 872, securing the battery pack 868 within a cavity enclosed by the tubular wall 872. In some embodiments, the elongated element 1024 may include a screw which may be turned to cause the encasing 1026 to wedge apart from the housing 1008 and press against the tubular wall 872.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

We claim:

1. A system for measuring displacement of an architectural brace that absorbs deformation inducing energy, the architectural brace comprising a core member having first and second ends attachable to architectural features to restrain motion between the architectural features and an intermediate portion between the first and second ends, and a buckling restraining assembly that encases the intermediate portion to resist buckling of the intermediate portion, the system comprising:
   a first coupling comprising a first attachment feature securable to the first end of the core member;
   a second coupling comprising a second attachment feature securable to the second end of the core member, wherein the second coupling is displaced from the first coupling by a displacement; and
   a sensor connected to the first coupling and the second coupling such that the sensor measures a plurality of changes in the displacement occurring over a period of time;
   wherein the sensor provides measurement data indicative of the changes.

2. The system of claim 1, further comprising a housing that contains the sensor.

3. The system of claim 2, further comprising:
   a battery pack disposed between the second coupling and the second end of the core member; and
   memory contained within the battery pack or the housing, wherein the memory receives and digitally stores the measurement data.

4. The system of claim 2, wherein the housing comprises a seal that substantially prevents entry of solid matter into an interior of the housing.

5. The system of claim 1, further comprising a battery pack disposed between the second coupling and the second end of the core member, wherein the battery pack includes one or more batteries that supply electrical power to the sensor.

6. The system of claim 1, wherein the sensor is configured to operate in a dormant mode, in which the sensor does not provide the measurement data, and an active mode, in which the sensor provides the measurement data;
   wherein, in response to a trigger condition indicative of a deformation inducing event, the sensor transitions from the dormant mode to the active mode.

7. The system of claim 1, wherein the measurement data comprise a plurality of strain measurements, each of which corresponds to one of the plurality of changes, wherein each of the strain measurements provides a level of strain in the core member.

8. The system of claim 7, wherein the sensor comprises:
   a first conductive contact secured in a fixed position relative to the first coupling; and
   a plurality of additional conductive contacts secured in a plurality of fixed positions relative to the second coupling;
   wherein, in response to the changes, the first conductive contact moves along an axis relative to the plurality of additional conductive contacts and into contact with one of the plurality of additional conductive contacts;
   wherein the plurality of fixed positions are distributed along the axis such that contact of the first conductive contact with any one of the plurality of additional conductive contacts is indicative of a specific magnitude of the displacement associated with that one of the plurality of additional conductive contacts;
   wherein contact of the first conductive contact with any one of the plurality of additional conductive contacts closes an electrical circuit specific to that one of the plurality of additional conductive contacts to generate a subset of the measurement data indicative of the specific magnitude of the displacement associated with that one of the plurality of additional conductive contacts.

9. The system of claim 1, further comprising the architectural brace, wherein the first coupling is secured to the first end of the core member, and the second coupling is secured to the second end of the core member.

10. A system for providing architectural support, the system comprising:
    an architectural brace that absorbs deformation inducing energy, the architectural brace comprising:
       a core member having first and second ends attachable to architectural features to restrain motion between the architectural features and an intermediate portion between the first and second ends; and
       a buckling restraining assembly that encases the intermediate portion to resist buckling of the intermediate portion; and
    a displacement measurement device comprising:
       a first coupling comprising a first attachment feature securable to the first end of the core member;
       a second coupling comprising a second attachment feature securable to the second end of the core member, wherein the second coupling is displaced from the first coupling by a displacement; and
       a sensor connected to the first coupling and the second coupling such that the sensor measures a plurality of changes in the displacement occurring over a period of time;
    wherein the sensor provides measurement data indicative of the changes.

11. The system of claim 10, wherein the buckling restraining assembly comprises:
    a cement layer that surrounds the intermediate portion of the core member to resist buckling of the intermediate portion; and
    a casing formed of metal, wherein the casing defines an interior cavity that contains the cement layer to keep the cement layer in place;
    wherein the displacement measurement device extends through the interior cavity;
    wherein the first coupling is secured to the first end of the core member, and the second coupling is secured to the second end of the core member.

12. The system of claim 10, wherein the buckling restraining assembly comprises:
    a cement layer that surrounds the intermediate portion of the core member to resist buckling of the intermediate portion; and
    a casing formed of metal, wherein the casing defines an interior cavity that contains the cement layer to keep the cement layer in place;
    wherein the displacement measurement device extends exterior to the casing;
    wherein the first coupling is secured to the first end of the core member, and the second coupling is secured to the second end of the core member.

13. The system of claim 10, wherein the displacement measurement device further comprises a housing that contains the sensor.

14. The system of claim 13, wherein the displacement measurement device further comprises:

a battery pack disposed between the second coupling and the second end of the core member; and memory contained within the battery pack or the housing, wherein the memory receives and digitally stores the measurement data.

15. The system of claim 13, wherein the housing comprises a seal that substantially prevents entry of solid matter into an interior of the housing.

16. The system of claim 10, wherein the displacement measurement device further comprises a battery pack disposed between the second coupling and the second end of the core member, wherein the battery back includes one or more batteries that supply electrical power to the sensor.

17. The system of claim 10, wherein the sensor is configured to operate in a dormant mode, in which the sensor does not provide the measurement data, and an active mode, in which the sensor provides the measurement data;

wherein, in response to a trigger condition indicative of a deformation inducing event, the sensor transitions from the dormant mode to the active mode.

18. The system of claim 10, wherein the measurement data comprise a plurality of strain measurements, each of which corresponds to one of the plurality of changes, wherein each of the strain measurements provides a level of strain in the core member.

19. The system of claim 18, wherein the sensor comprises:

a first conductive contact secured in a fixed position relative to the first coupling; and a plurality of additional conductive contacts secured in a plurality of fixed positions relative to the second coupling;

wherein, in response to the changes, the first conductive contact moves along an axis relative to the plurality of additional conductive contacts and into contact with one of the plurality of additional conductive contacts;

wherein the plurality of fixed positions are distributed along the axis such that contact of the first conductive contact with any one of the plurality of additional conductive contacts is indicative of a specific magnitude of the displacement associated with that one of the plurality of additional conductive contacts;

wherein contact of the first conductive contact with any one of the plurality of additional conductive contacts closes an electrical circuit specific to that one of the plurality of additional conductive contacts to generate a subset of the measurement data indicative of the specific magnitude of the displacement associated with that one of the plurality of additional conductive contacts.

20. A system for providing architectural support, the system comprising:

an architectural brace that absorbs deformation inducing energy, the architectural brace comprising:

a core member having first and second ends attachable to architectural features to restrain motion between the architectural features and an intermediate portion between the first and second ends; and a buckling restraining assembly that encases the intermediate portion to resist buckling of the intermediate portion, wherein the buckling restraining assembly comprises:

a cement layer that surrounds the intermediate portion of the core member to resist buckling of the intermediate portion; and a casing formed of metal, wherein the casing defines an interior cavity that contains the cement layer to keep the cement layer in place; and a displacement measurement device that extends through the interior cavity, the strain measurement device comprising:

a first coupling secured to the first end of the core member;

a second coupling secured to the second end of the core member, wherein the second coupling is displaced from the first coupling by a displacement;

a housing;

a sensor contained within the housing and connected to the first coupling and the second coupling such that the sensor measures a plurality of changes in the displacement occurring over a period of time, wherein the sensor provides measurement data indicative of the changes;

memory contained within the housing, wherein the memory receives and digitally stores the measurement data; and a battery stored within the housing, wherein the battery supplies electrical power to the sensor;

wherein the housing comprises a seal that substantially prevents entry of solid matter into an interior of the housing;

wherein the measurement data comprise a plurality of strain measurements, each of which corresponds to one of the plurality of changes, wherein each of the strain measurements provides a level of strain in the core member.

* * * * *